Nov. 18, 1958 W. R. BROWNLEE 2,861,196
LOAD ASSIGNING APPARATUS FOR ELECTRIC POWER SYSTEMS
Filed Jan. 7, 1957 5 Sheets-Sheet 1

INVENTOR.
WILLIAM R. BROWNLEE
BY Arthur H. Swanson
ATTORNEY.

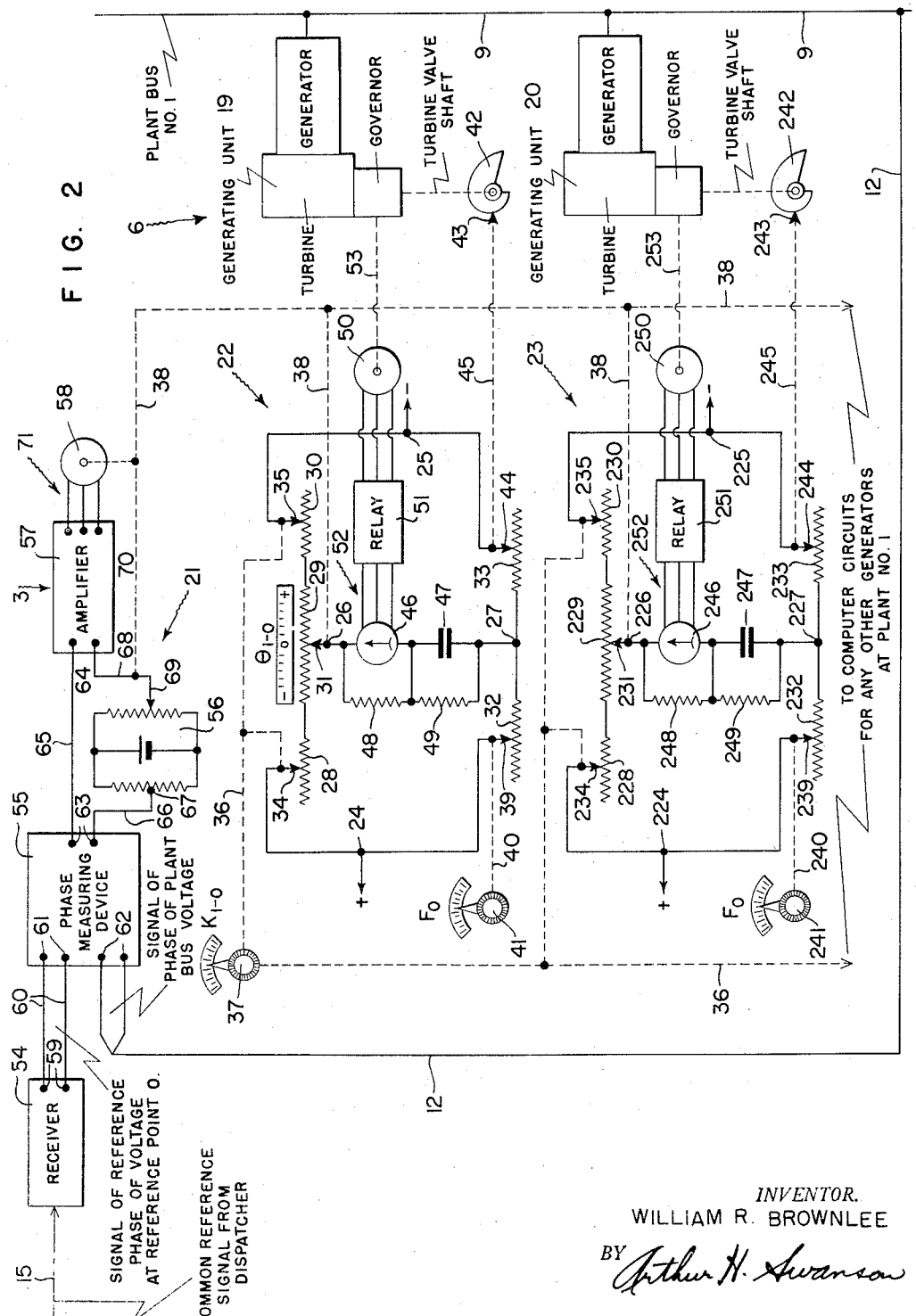

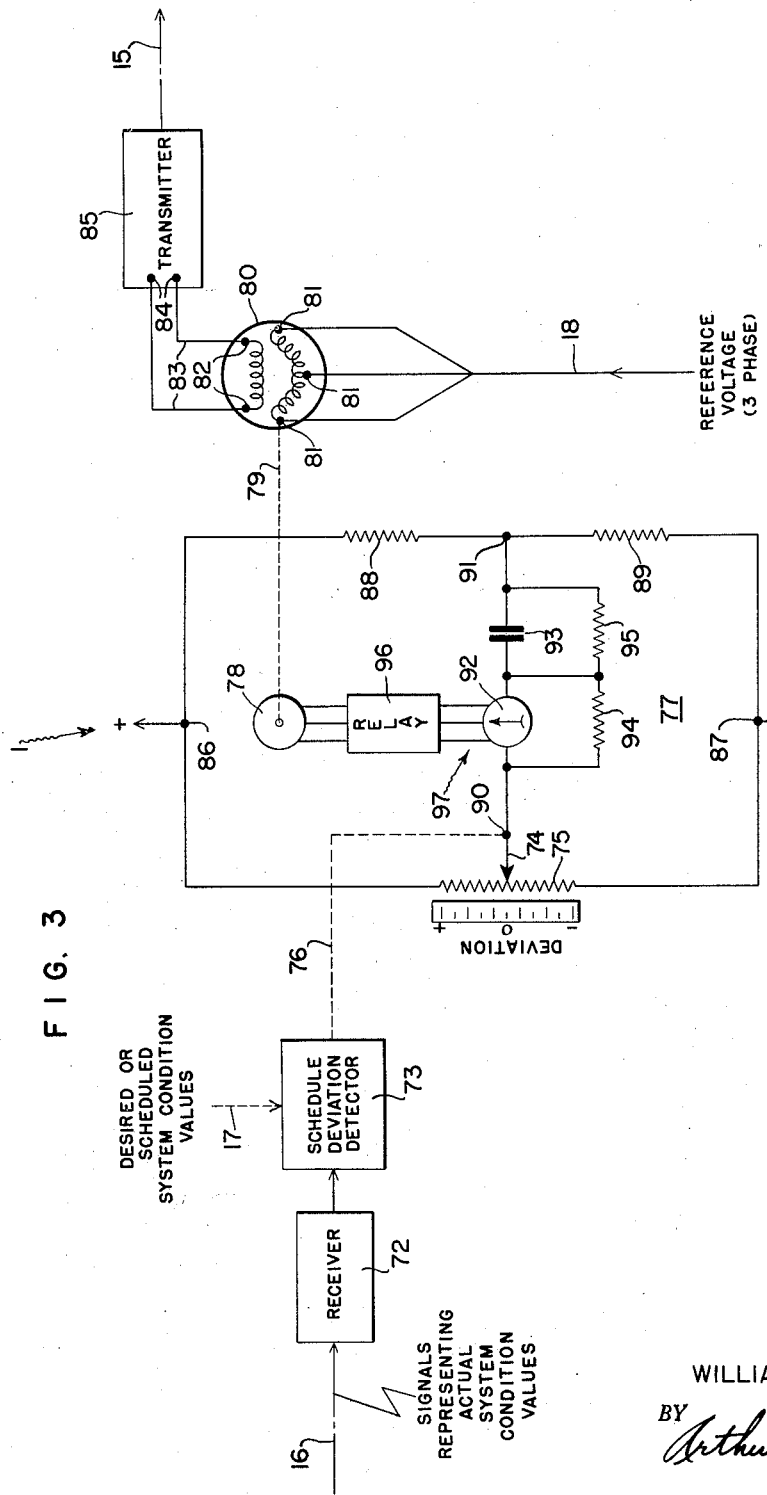

Nov. 18, 1958   W. R. BROWNLEE   2,861,196
LOAD ASSIGNING APPARATUS FOR ELECTRIC POWER SYSTEMS
Filed Jan. 7, 1957   5 Sheets-Sheet 4
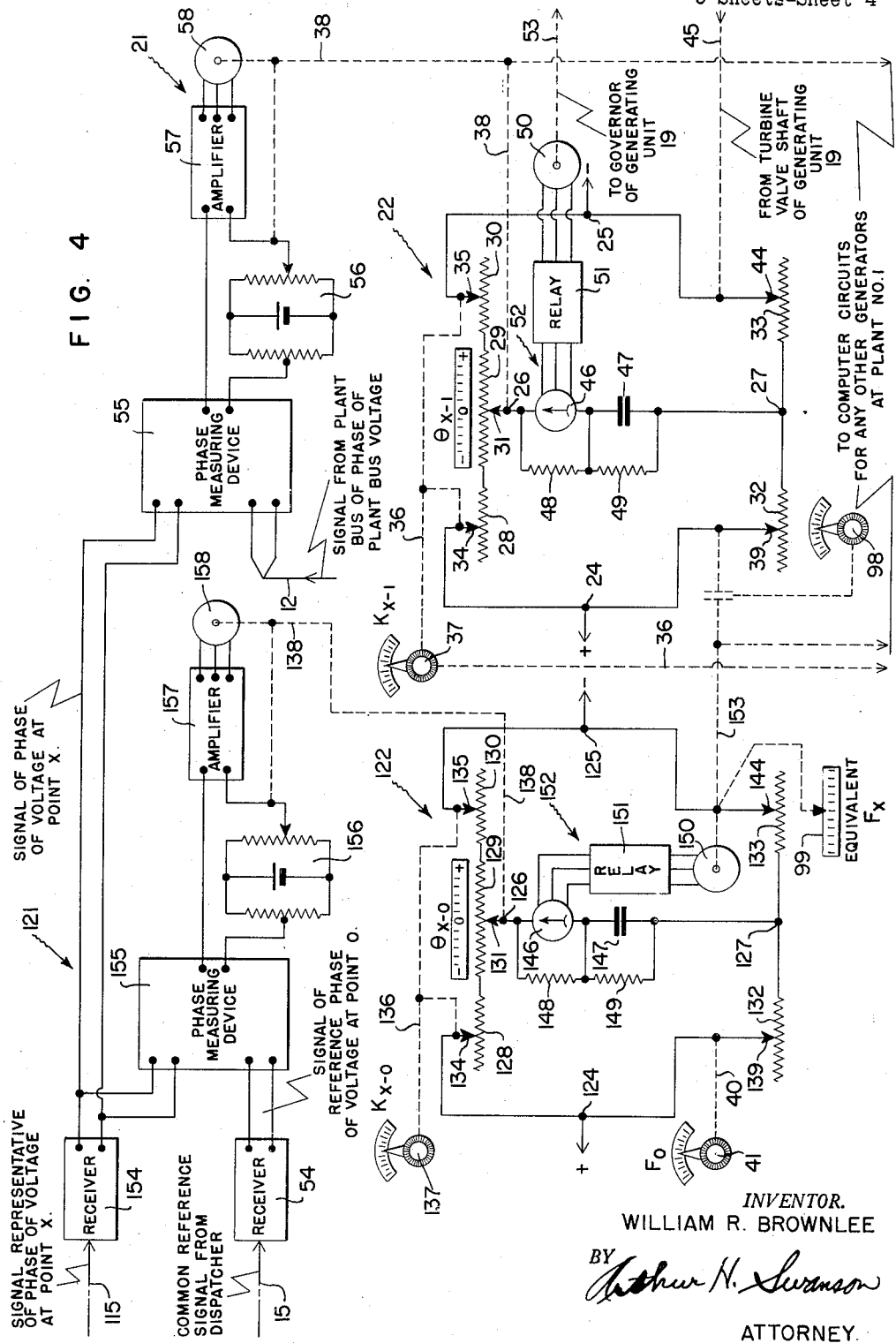
INVENTOR.
WILLIAM R. BROWNLEE
BY Arthur H. Swanson
ATTORNEY.

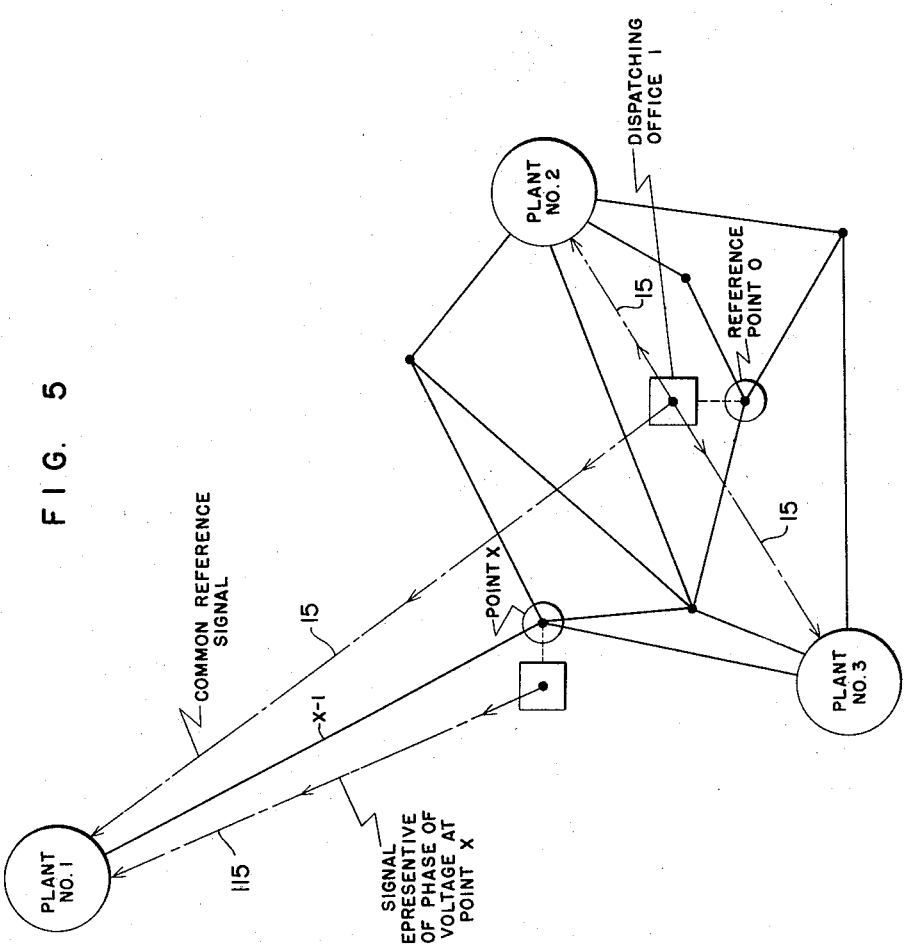

United States Patent Office 2,861,196
Patented Nov. 18, 1958

2,861,196

LOAD ASSIGNING APPARATUS FOR ELECTRIC POWER SYSTEMS

William R. Brownlee, Birmingham, Ala.

Application January 7, 1957, Serial No. 632,807

17 Claims. (Cl. 307—57)

The present invention relates generally to the assignment of the loads to the interconnected generating plants of an electric power generating and distributing system in such a manner as to maintain at a minimum the cost of the total delivered energy in the system, and hence to provide the most economical operation of the system. Specifically, the invention relates to methods and apparatus for automatically effecting such assignment of the plant loads in accordance with the incremental costs of delivered energy for the plants so as to coordinate the incremental generating costs and incremental transmission losses in the system to the end of securing the most economical combination of plant loadings.

More specifically, the present invention pertains to methods and apparatus of the stated type wherein the loads or outputs of the controlled system plants are controlled automatically as necessary to equalize the incremental costs of delivered energy for the plants, and hence to maintain the plants in economic balance, to the end of achieving an optimum plant loading schedule, and the most economical system operation.

A general object of the present invention is to provide an improved method and apparatus for use in assigning the loads to the interconnected generating plants of an electric power generating and distributing system in accordance with the incremental costs of delivered energy for the plants so as to coordinate the incremental transmission losses and incremental generating costs in the system to the end of securing the most economical loading of the system plants and the most economical operation of the system.

A specific object of the invention is to provide novel apparatus of the foregoing type which determines at each of selected ones of the system plants the amount and direction, if any, by which the output of the plant must be changed in order to maintain equality between the incremental costs of delivered energy for the system plants, and hence to maintain the plants in economic balance, for the existing system conditions.

A more specific object of the invention is to provide novel apparatus of the type just described which produces at each selected system plant a deviation effect representative of any departure from equality between the incremental cost of delivered energy for the plant and the incremental cost of delivered energy common to the others of the system plants at that time, and hence representative of any deviation of the plant from economic balance with respect to the other plants, said deviation effect being a measure of the amount and direction by which the plant output must be changed in order to obtain equality between the incremental costs of delivered energy for the plants, and economic balance between the plants, for the existing system conditions.

A still more specific object of the invention is to provide novel apparatus as just specified which produces at each selected system plant an effect which is a measure of the incremental transmission loss for the plant with respect to a chosen common reference point in the system, and which effects a comparison at each of these plants between said loss effect and an effect produced at the plant which is a measure of the incremental generating cost for the plant with respect to said reference point, said loss and cost effects being equal when the plant is in economic balance and has the same incremental cost of delivered energy as the other system plants.

An even more specific object of the invention is to provide novel apparatus of the type just described which detects at each plant, by means of said comparison, any deviation between the loss and cost effects produced at the plant, and which utilizes this detected deviation to produce said deviation effect which is representative of any deviation or departure of the plant from economic balance.

A still more specific object of the invention is to provide novel apparatus as just specified wherein each of said incremental transmission loss effects is produced or computed at the corresponding plant in the form of an incremental transmission loss ratio for the plant with respect to said common reference point, wherein each of said ratios is a function of solely (1) the phase angle between the bus voltage of the corresponding plant and a common reference voltage individual to said reference point, and (2) the constant ratio of the reactance to the resistance of the equivalent path or transfer impedance between the corresponding plant and said reference point, and wherein each of said incremental generating cost effects is computed at the corresponding plant in the form of an incremental generating cost ratio for the plant with respect to said reference point, for comparison at the plant with the corresponding incremental transmission loss ratio.

It is also a specific object of the invention to provide novel apparatus and circuitry for effecting the foregoing computations, comparisons, detections, and deviation effect production.

Another specific object of the invention is to provide novel apparatus of the foregoing type where in a single common master reference signal is supplied to all of the selected system plants for coordinating the production at the plants of said deviation effects which are representative of departures of the plants from economic balance with each other.

A more specific object of the invention is to provide novel apparatus as just specified wherein the phase of said master reference signal is the same at all plants, and wherein said phase angle at each plant, which determines said incremental transmission loss ratio for the plant, is the phase angle between the bus voltage of the plant and said reference signal.

An even more specific object of the invention is to provide novel apparatus as just specified wherein the phase of said reference signal has a value which is varied in accordance with deviation between desired and existing operating conditions in the system.

Another specific object of the invention is to provide novel apparatus of the foregoing type which automatically controls the output of each of the selected system plants, in accordance with said deviation effect produced at the plant, as necessary to maintain equal the incremental transmission loss and generating cost effects for the plant, and thus to maintain the plant in economic balance with respect to said reference point and hence the others of the system plants.

Still another specific object of the invention is to provide a novel method and apparatus of the type specified herein for determining the incremental value or cost of energy at a location or point in the system, other than a plant, by relating this value of energy at said point to the known energy value at some other system point, such as said common reference point.

Finally, it is a specific object of the invention to provide a novel economic load assigning method and apparatus of the foregoing character wherein a common master reference signal is sent to all of the system plants to be controlled, wherein this signal is utilized at each plant in the control of the plant output as necessary to coordinate the incremental cost of delivered energy for the plant with those of the other system plants to the end of equalizing these incremental delivered energy costs and hence producing the most economical combination of plant outputs, and wherein said signal also controls the output of each plant as necessary to correct for deviations between actual and desired system operating conditions, whereby the selected system plants are loaded automatically in the manner necessary to provide at all times the desired system operating conditions in the most economical manner.

It has been recognized in the past that the maintenance of an optimum generating or loading schedule in a power system, for maintaining economical system operation and a minimum cost of total delivered energy in the system, requires the continual coordination of the system generating costs and transmission losses. To this end, various methods have been developed in the past for obtaining system transmission loss constants, usually referred to as B-type constants, and arrangements have been described for applying these constants to system load scheduling or dispatching problems. These applications have usually involved the comparison of incremental fuel costs and incremental transmission losses in arriving at the optimum generating schedules to be followed, the incremental transmission losses being calculated on the basis of the previously determined B-type constants mentioned above.

As is well known to those skilled in the art, the foregoing previously known and used methods of calculating and coordinating incremental costs and losses for arriving at optimum generating schedules are subject to numerous significant disadvantages. These disadvantages are due, primarily, to the frequently unsatisfactory nature of the B-type constants, to the practical difficulties encountered in obtaining such constants, and to the complexity of the computations involved in applying the constants to the problem and in solving the resulting simultaneous equations.

I have discovered, however, a novel method for determining incremental transmission losses which is not subject to the above-noted disadvantages associated with the B-type loss constants and their use in obtaining optimum generating schedules. Specifically, I have discovered that a unique relationship exists between the incremental transmission loss between two points and the phase angle between the voltages at these points. More specifically, I have discovered that the incremental transmission loss $$\left(\frac{dL}{dP}\right)$$

between two plants can be expressed as a function of solely the phase angle ($\theta$) between the bus voltages of the two plants and the constant ratio of reactance to resistance ($K$) of the equivalent path joining the two plants.

This unique relationship has been described, developed, and explained in my paper entitled "Co-ordination of Incremental Fuel Costs and Incremental Transmission Losses by Functions of Voltage Phase Angles" which appeared at pages 529 to 533 of part III-A, "Power Apparatus and Systems," of volume 73 of the AIEE Transactions. In that paper, I have shown that the following incremental transmission loss equation properly defines the incremental transmission loss between two plants in terms of solely the factors noted and defined above:

$$\frac{dL}{dP} = \frac{2 \sin \theta}{K \cos \theta + \sin \theta}$$

I have also shown in the above-mentioned paper that this unique expression for incremental transmission loss can be utilized to advantage in a practical comparison method which I have developed for determining, in an accurate but relatively simple manner, when the plants of a system, and hence the entire system, are in economic balance, and hence when the system is operating at a minimum cost of total delivered energy. Specifically, I have shown in said paper that the Plants 1 and 2 of any given pair of plants of a system will have the same incremental cost of delivered energy at any given point, and hence will be in economic balance, when the following economic balance equation, relating the incremental generating costs and incremental transmission losses for the two plants, is satisfied:

$$\frac{dF_2/dP_2}{dF_1/dP_1} = \frac{K \cos \theta + \sin \theta}{K \cos \theta + \sin \theta}$$

wherein: $dF_1/dP_1$ and $dF_2/dP_2$ are the incremental generating costs for Plants 1 and 2, respectively, $K$ is the above reactance-resistance ratio of the transfer impedance or equivalent path between the two plants, and $\theta$ is the phase angle by which the bus voltage at Plant 1 leads the bus voltage at Plant 2.

As pointed out in said paper, the foregoing balance equation for a pair of plants compares the incremental transmission loss ratio between the plants, as determined by my foregoing incremental transmission loss equation, with the incremental generating cost ratio for the plants. Thus, when this balance equation is satisfied, the corresponding plants operate at the same incremental cost of delivered energy at any given point, and are in economic balance. Further, when all pairs of the system plants are in such economic balance, the entire system is in economic balance.

The foregoing phase angle loss computing and comparison method for determining when the pairs of plants of a system are in economic balance, and when the entire system is in balance, is, and is described in said paper as being, a method which was developed for use in simplifying the adequate planning of power system expansion. I have discovered, however, that this method also constitutes a highly effective, advantageous, and practical tool of relative simplicity for use in assigning the loads to the plants of an actual, operating system so as to provide optimum generating or loading schedules and economical system operation under the actual system loading and operating conditions, inasmuch as the practice of this method requires a knowledge of only three readily obtainable factors: namely, plant incremental generating costs, constant reactance to resistance ratios, and plant bus voltage phase angles. Moreover, the use of this method in the above manner does not involve the disadvantages encountered with the use of the previously known methods employing the B-type loss constants, since the present method is not subject to the deficiencies inherent in the prior methods. These factors, together with the basic concepts involved in my comparison method, make this method a highly desirable and practical one for use in apparatus invented by me for automatically determining when the plants of an operating system are in economic balance, for computing what changes, if any, in the plant loadings are needed to provide the most economical combination of plant loadings, and for automatically controlling the loading of the plants in accordance with the computed optimum loading data.

Accordingly, in my copending application Serial No. 632,917, filed on even date herewith, I have disclosed and claimed novel apparatus invented by me which is operative in accordance with the foregoing incremental transmission loss and balance equations and comparison method to produce effects representative of the incremental transmission loss ratio for a pair of interconnected generating plants, to detect deviation from economic balance between pairs of such plants, and to assign the loads to such plants in relation to the incremental costs of delivered energy for the plants.

As explained in the aforementioned application, the nature of the load assigning method and apparatus disclosed therein makes it desirable, when selecting the pairs of plants between which the incremental costs and losses are to be compared, to choose, for the plants of each pair, plants which are adjacent electrically, so as to minimize the influence of intervening plants on the computed incremental losses. I have discovered, however, a unique expression which accurately relates the incremental transmission loss between two plants to the phase angle between the bus voltages of the plants notwithstanding the presence of intermediate generation along the path interconnecting the two plants.

Specifically, this new expression for the incremental transmission loss between two plants takes into account the effect or influence exerted on the incremental loss by a typical intermediate generating plant. In other words, this expression is based on the assumption that there is an intermediate plant on the line connecting the two plants between which it is desired to determine the incremental transmission loss, and the expression is therefore arranged to provide a measure of the true incremental transmission loss between said two plants, taking into account the influence of an intermediate plant.

This novel two-step or two-section expression or equation for the incremental transmission loss between two plants is derived and developed from my foregoing simple or single-step loss equation by applying the latter in two successive steps in the manner shown in Appendix I of my aforementioned paper, wherein the derivation of this two-step equation is set forth. As shown in said paper, this equation is:

$$\frac{dL}{dP} = \frac{4K \tan \tfrac{1}{2}\theta}{(K + \tan \tfrac{1}{2}\theta)^2}$$

wherein $$\frac{dL}{dP}$$

is the incremental transmission loss between the two plants in question which is to be determined by means of the equation, and wherein $\theta$ and $K$ are the respective phase angle between the plant bus voltages and the constant ratio of reactance to resistance or equivalent path between the plants, all as for the single-step loss equation as set forth hereinbefore. It is apparent that this two-step loss equation, like its single-step forerunner, provides a measure of the incremental transmission loss in terms of or as a function of solely the phase angle $\theta$ and the constant $K$.

I have found that the procedure on which this two-step equation is based, of treating each pair of plants as if there were one intermediate plant on a direct line between them, renders the equation adequately accurate for use in calculating the incremental transmission loss between practically any two plants of the system, since it provides accurate results for both closely and widely spaced plants, either with or without intermediate or intervening generation on the line between them. In the case of plants which are near to each other, the phase angles are relatively small, so that there is practically no difference in the loss values obtained by the single-step and two-step equations. The larger phase angles are most likely to occur for plants with greater separation and hence with intervening plants, and for these the two-step equation is closely applicable.

The foregoing two-step loss equation, like the foregoing original one-step loss and comparison equations and method, is, and is described in the aforementioned paper as being, an expression which was developed for use in simplifying the adequate planning of power system expansion. I have discovered, however, that this two-step loss expression or equation constitutes a practically useful and desirable tool for use in automatically determining deviation from economic balance between the plants of an actual operating system, and in assigning the plant loads in such an actual system so as to provide the most economical combination of plant loadings. An important feature of the two-step loss equation in this connection is that its use makes it unnecessary for the plants between which economic balance comparisons are effected to be electrically close together.

In connection with the last mentioned discovery, I have invented improved economic load assigning apparatus which operates according to the foregoing two-step loss method and equation, and hence embodies the foregoing feature. Thus, this improved apparatus can be and desirably is arranged to compare the incremental generating costs and transmission losses between one plant, chosen as the reference plant, and each other plant of the system. In other words, the use of the foregoing two-step loss equation in this apparatus permits each generating plant in the system to be compared directly with a single chosen reference plant, since the greater distances between compared plants resulting from this comparison method do not produce consequential inaccuracies when the two-step loss equation is employed.

This improved economic load assigning apparatus, constructed and arranged to operate in accordance with the foregoing two-step loss equation and hence in accordance with the desirable direct plants-to-reference plant economic balance comparison method just described, operates with improved accuracy and flexibility, and with a smaller amount of equipment, in comparison to the apparatus of my aforementioned copending application. Therefore, it is apparent that this improved apparatus represents a practical and significant advance over the apparatus of said copending application. This improved apparatus is disclosed and claimed in a second copending application of mine Serial No. 632,839, filed on even date herewith.

I have also discovered, moreover, and have disclosed and claimed in the last mentioned application, an improved, novel comparison method for determining when the two plants of a pair are in economic balance and hence have equal incremental cost and loss ratios and equal incremental costs of delivered energy, for detecting deviation from economic balance between such plants, and for use in assigning the loads to the plants in accordance with their incremental costs of delivered energy. This improved comparison method is characterized by the use of an incremental transmission loss ratio which is a predetermined linear function of the corresponding phase angle $\theta$.

Specifically, in accordance with this improved comparison method, an incremental transmission loss ratio for two plants, which is a predetermined linear function of the phase angle $\theta$ for the two plants, is compared to an incremental generating cost ratio for the two plants which is equal to the incremental transmission loss ratio when the two plants are in economic balance. Any deviation or difference between these ratios represents a corresponding deviation from economic balance between the two plants, and a corresponding deviation from equal incremental costs of delivered energy for the two plants.

In connection with the foregoing novel comparison method, I have developed, and have disclosed in the last mentioned application, a novel economic balance or comparison expression or equation which is based on the foregoing two-step loss equation and in which the incremental transmission loss ratio term is a linear function of $\theta$, while the incremental generating cost ratio term is selected and arranged to be equal to the loss ratio term when the two plants involved have equal incremental delivered energy costs at any given point and are in economic balance. This novel linear two-step balance equation is:

$$\frac{dF_2/dP_2 - dF_1/dP_1}{dF_2/dP_2 + dF_1/dP_1} = \frac{2K \tan \tfrac{1}{2}\theta}{K^2 + \tan^2 \tfrac{1}{2}\theta} \quad (1)$$

wherein: $dF_1/dP_1$ and $dF_2/dP_2$ are the incremental generating costs for two plants, 1 and 2, respectively, and $K$ and $\theta$ are the foregoing respective constant ratio and bus voltage phase angle for the two plants.

Equation 1 is obtained by rearranging the basic economic balance Equation 11 of my aforementioned paper, $$\frac{dF_2/dP_2}{dF_1/dP_1} = \frac{1}{1 - dL/dP_{1-2}}$$

as:

$$\frac{dF_2/dP_2 - dF_1/dP_1}{dF_2/dP_2 + dF_1/dP_1} = \frac{dL/dP_{1-2}}{2 - dL/dP_{1-2}}$$

and by combining this new basic balance equation with the foregoing two-step incremental transmission loss equation of column 5, line 32:

$$\frac{dL}{dP} = \frac{4K \tan \frac{1}{2}\theta}{(K + \tan \frac{1}{2}\theta)^2}$$

By assigning a series of values to $\theta$ in the right-hand or loss ratio term of the foregoing improved balance Equation 1, and by then plotting a series of curves of the value of the loss ratio term versus $\theta$, each curve being for a different arbitrarily assigned value of K, it is seen that this loss ratio term is a linear function of $\theta$, as is desired. Specifically, it is shown by such plotted curves that this loss ratio term can be expressed as follows:

$$\frac{2K \tan \frac{1}{2}\theta}{K^2 + \tan^2 \frac{1}{2}\theta} = \frac{0.0184K}{K^2 + 0.17}\theta \quad (2)$$

Since the right-hand term of Equation 2 is clearly a linear expression or function of $\theta$ for any given value of the constant K, it is apparent that the incremental transmission loss ratio term of the above balance Equation 1 is a linear function of $\theta$.

Accordingly, the above two-step linear balance Equation 1 can be written:

$$\frac{dF_2/dP_2 - dF_1/dP_1}{dF_2/dP_2 + dF_1/dP_1} = \frac{0.0184K}{K^2 + 0.17}\theta \quad (3)$$

Thus, when the value of the left-hand, incremental generating cost ratio term of Equation 3 is equal to the incremental transmission loss ratio value expressed by the right-hand term as a linear function of $\theta$, Equation 3 is satisfied, and the two plants involved have the same incremental cost of delivered energy at any given point, and hence are in economic balance.

In addition to discovering the foregoing novel linear comparison method, I have invented novel apparatus for carrying out this method in accordance with the foregoing linear balance or comparison Equations 1 and 3. As will be apparent, this new apparatus represents a practical and significant improvement over the apparatus of my first mentioned copending application, since the improved apparatus provides improved accuracy and flexibility of operation while being appreciably less complex than that of said first mentioned copending application. This improved apparatus is disclosed and claimed in the second of my above-noted copending applications.

In addition to the foregoing, I have discovered an improved and novel economic balance determining and plant load assigning method which I am disclosing and claiming herein as the improved method of the present invention, and which is characterized by the foregoing objects. This improved method is based on the foregoing linear two-step balance Equations 1 and 3, but represents a significant and practical improvement over the foregoing method.

Specifically, the improved method of the present invention is based on a discovery which I have made that the economic balance and relative incremental delivered energy cost determinations for the plants of a system can be effected by comparing each plant with a predetermined reference point on the system which is common to all of the plants and which is not necessarily a generating plant. This discovery also embodies the novel concept that such comparisons and determinations be made at the respective plants. In this connection, I have discovered that the plant loads or outputs can be advantageously assigned in an economic manner at the respective plants on the basis of the relative incremental delivered energy cost and economic balance computations and comparisons effected at the plants themselves. One of the many advantages of this improved method is the resulting elimination of the need for telemetering data back and forth between each plant and a central location, as is required in the performance of my previous load assigning methods.

More specifically, I have discovered that the foregoing economic balance Equation 3 can be rewritten as a new economic balance or comparison equation for comparing any generating plant with a fixed and arbitrary value of generating cost at the aforementioned chosen common point on the system. This new equation is:

$$\frac{dF_n/dP_n - F_o}{dF_n/dP_n + F_o} = \frac{0.0184K}{K^2 + 0.17}\theta_{n-o} \quad (4)$$

wherein: $dF_n/dP_n$ is the incremental generating cost for plant $n$, $F_o$ is the arbitrary reference generating cost for the common reference point $o$, $\theta_{n-o}$ is the phase angle in degrees by which the bus voltage at Plant $n$ leads the reference voltage at point $o$, and K is the constant ratio of the reactance to the resistance of the equivalent path or transfer impedance between Plant $n$ and point $o$.

It will be remembered that Equation 3 is employed to determine when the plants of a pair are in economic balance, since this equation is satisfied only when the incremental delivered energy costs of the compared plants are equal, and hence when the plants are in economic balance. Similarly, the new balance Equation 4 is employed in accordance with the present invention to determine when the corresponding plant is in economic balance with respect to said common point, since this new equation is satisfied only when the incremental delivered energy cost for the corresponding plant is equal to the incremental delivered energy cost common to the other plants at the time, and hence when the corresponding plant is in economic balance with the other plants.

Finally, in connection with the foregoing improved method, I have invented improved and novel economic balance determining and plant load assigning apparatus which I am disclosing and claiming herein as the improved apparatus of the present invention. This apparatus is characterized by the foregoing objects of the present invention, and represents a significant and practical improvement over the apparatus and arrangements of my aforementioned copending applications. Of the many practical advantages provided by this improved apparatus, one of especial importance is the material reduction in the number of telemetering channels required as compared with the number needed when the arrangements of my aforementioned copending applications are employed.

In accordance with the foregoing, it is an object of the present invention to provide a novel method and apparatus as just described whereby an economic balance determination is effected at each of selected ones of the system plants by means of computing, comparing, and economic balance deviation detecting apparatus located at the corresponding plant and operating, in accordance with the improved economic balance Equation 4, and hence in accordance with my improved economic balance comparison method and my novel phase angle method of incremental transmission loss determination, to provide an effect which is representative of any departure of the incremental delivered energy cost for the corresponding plant from equality with the incremental delivered energy cost which is then common to the others of the plants, and whereby the effect so derived at each plant is utilized at the plant as a measure of the load change to be assigned to the plant in order to reestablish equality between the incremental delivered energy costs for the plants, and hence to cause the plants to be loaded in the most economical manner.

The foregoing and other desirable objects of the present invention are fulfilled by providing at each system plant, in accordance with the invention, a computing and comparing arrangement for determining when the corresponding plant is in economic balance with the others of the plants, for detecting any deviation from such balance, and for deriving and producing an effect or signal which is representative of or a measure of any such deviation or departure from balance, and which is also a measure of the amount and direction by which the plant output must be changed in order to return the plant to a state of economic balance with the other plants. This arrangement at each plant operates to derive and produce a first effect or signal which is representative of or a measure of the existing incremental transmission loss for the corresponding plant with respect to a chosen reference point in the system which is common to all of said plants. Said arrangement also derives and produces at its plant a second effect or signal which is a measure of the existing incremental generating cost for that plant with respect to said common point, said first and second effects being equal when the corresponding plant is in economic balance. Finally, said arrangement compares said first and second effects and produces its economic balance deviation effect or signal upon the detection of inequality between said effects.

In providing the foregoing operation, each of said arrangements according to the invention produces at its corresponding plant as said first or loss effect a signal which is proportional in magnitude to the actual value for that plant of the right-hand or incremental transmission loss ratio term of balance Equation 4. This value as computed is thus a linear function of the value of the phase angle $\theta_{n-o}$ between the bus voltage of the corresponding plant (Plant $n$) and the reference voltage at the reference point $o$. To this end, a single common master reference voltage signal is supplied to all of the plants, this signal having a phase which is the same at all plants and which is representative of the phase of the reference voltage at point $o$. A phase comparison is effected between this signal and the plant bus voltage to determine the value of $\theta_{n-o}$. The phase angle $\theta_{n-o}$ at each plant is thus the phase angle between the plant bus voltage and the reference signal, and is specifically the angle in degrees by which the plant bus voltage leads the reference signal.

The second or cost effect produced at each plant is a signal which is proportional in magnitude to the actual value for the corresponding plant of the left-hand or incremental generating cost ratio term of balance Equation 4. When any plant is not in economic balance with respect to the reference point, and hence with respect to the other plants, the incremental generating cost signal does not equal the incremental transmission loss signal for the plant, Equation 4 is not satisfied, and the foregoing deviation signal is produced, having a magnitude and sense which are respectively dependent upon the extent and direction of plant unbalance. This magnitude and sense are also respectively representative of the extent and direction of departure of the incremental delivered energy cost for the plant from a common value for all of the plants representing the most economical plant loadings.

Finally, said magnitude and sense of the deviation signal are presentative of the respective amount and direction by which the plant output must be changed in order to restore the plant to the balanced condition, make the plant loss and cost signals equal, satisfy Equation 4, reduce the deviation signal to zero, cause the plant to operate at the same incremental cost of delivered energy as the rest of the plants, and cause the system to operate in the most economical manner.

The deviation signal produced at each plant is utilized as a basis for assigning the load to the plant in accordance with its incremental cost of delivered energy, or, more specifically, for effecting the change in the plant output necessary to restore the plant to economic balance. Such load assignment or load change may be effected manually in response to an indication produced by the deviation signal, or may be effected automatically by the deviation signal. In either case, the output of the plant is changed in accordance with the deviation signal in the direction and to the extent necessary to reduce this signal to zero.

For the purpose of controlling the plant outputs as dictated by the requirements of the system, provisions are made, according to the invention, for varying the phase of the reference signal in accordance with the deviation, if any, between the actual and desired operating conditions of the system, or, in other words, in accordance with the deviation of the existing values of the system conditions from the scheduled values of these conditions. Such changes made to the common phase of the reference signal cause the plant balance deviation signals to change correspondingly and to reflect the schedule deviations. This results in plant output changes which correct for and eliminate the schedule deviations, these changes being made in such a manner that the new values of plant loads represent the most economical combination of plant loadings for the new system condition values.

Accordingly, the common reference signal sent to all plants can be made to effect the changes in the plant outputs necessary to eliminate system schedule deviations, while at the same time maintaining the most economical distribution of the system load among the plants. Thus, this reference signal serves to control the plant outputs as necessary to maintain the scheduled values of the system conditions, in addition to serving to coordinate the economic balance comparisons made at the plants and controlling the plant outputs so as to provide the most economical combination of plant loadings for the existing systems conditions.

In accordance with a further aspect of the present invention, means may be included at one or more of the foregoing plants for determining and providing at that plant an effect or indication of the equivalent generating cost at some other location in the system relative to the arbitrary reference generating cost for the reference point $o$. Such means may be employed for the purpose of providing, at the plant including it, an indication of the incremental value of energy at said location, which location may well be an interconnection point between the system and that of another area or company. In some cases, said means may serve a correcting function at the plant including it, the correction obtained being one which may be desirable for the case where said location is a predetermined system point which is electrically located between the plant in question and the reference point, and where there is a substantial difference between the reactance-resistance ratios of the transfer impedances between the plant and said predetermined point, and between said predetermined point and the reference point.

A better understanding of the present invention may be had from the following detailed description of apparatus embodying the invention, which description is to be read in connection with the accompanying drawings, wherein:

Fig. 2 is a schematic circuit diagram of a form according to the invention which the economic balance computing, comparing, and load assigning apparatus at each of the Fig. 1 system plants may take;

Fig. 3 is a schematic circuit diagram of a form according to the invention which the common reference signal producing apparatus at the dispatcher's location of the Fig. 1 arrangement may take;

Fig. 4 is a schematic circuit diagram of a modification of a portion of the Fig. 2 apparatus embodying the invention and useful in certain cases; and Fig. 5 is a diagrammatic representation of a power system configuration of a type with which the Fig. 4 arrangement may be used to advantage.

THE ARRANGEMENT OF FIG. 1

Figure 1:
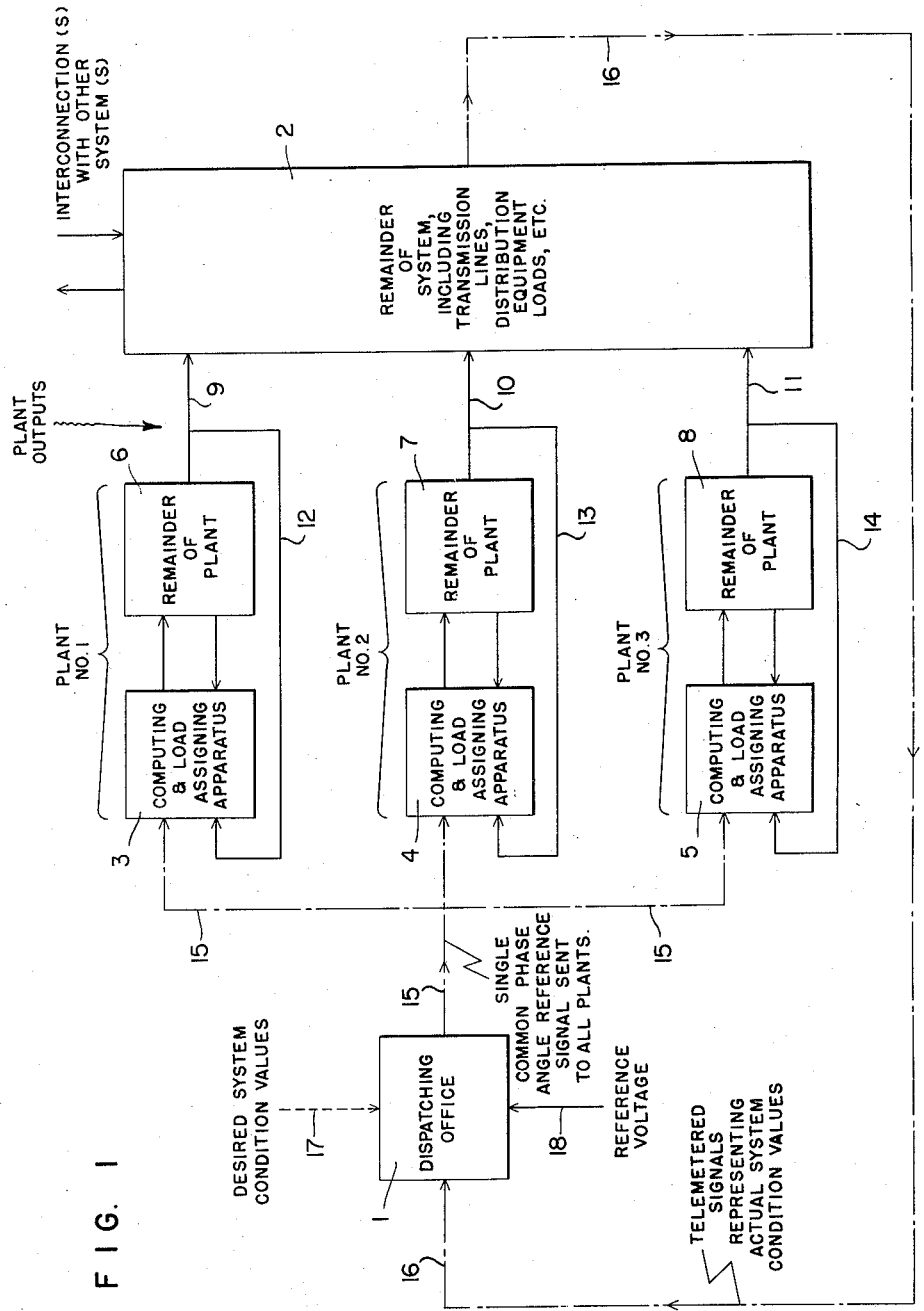
Fig. 1 is a block diagram showing a typical application of the present invention to a typical electric power generation and distribution system.

The block diagram of Fig. 1 illustrates broadly a typical electric power generation and distribution system which is under the control of automatic economic load assigning apparatus according to the present invention. The system of Fig. 1 is shown, by way of example, as having three generating plants whose outputs are under the control of the apparatus of the invention. It is to be borne in mind, however, that the method and apparatus of the invention are applicable to systems having any number of generating plants, and to systems having certain selected plants under the control of the apparatus of the invention and having other plants which, for one or another reason, are not subject to the economic load assigning operation provided by this apparatus. Also, the method and apparatus of the invention are applicable to systems wherein the outputs of certain of the system plants are controlled automatically by the apparatus of the invention while the outputs of certain of others of the system plants are controlled manually in accordance with information provided by the apparatus. Moreover, the invention is applicable to systems wherein all of the plants are under automatic control or are under manual control.

However, for simplicity of description and explanation, it will be assumed herein that the system of Fig. 1 includes only the illustrated three generating plants, and that all of these plants have their outputs or generation assigned or controlled in an optimum economic manner by apparatus according to and embodying the present invention. Thus, the loads are assigned to the three plants of the Fig. 1 system by said apparatus in accordance with the incremental costs of delivered energy for the plants so as to coordinate the incremental transmission losses and incremental generating costs in the system to the end of securing the most economical combination of loadings for the three plants, and the most economical operation of the system, under the existing system conditions.

The three plants of the sysetm shown in Fig. 1 have been designated in Fig. 1 as Plant No. 1, Plant No. 2, and Plant No. 3. The system also includes a dispatcher's location or dispatching office generally designated by the rectangle identified by the numeral 1. The remainder of the system is generally designated by the rectangle bearing the numeral 2, and includes the system transmission lines, distribution equipment, loads, and all of the other system portions and equipment other than the Plants 1, 2, and 3 and the dispatching office 1.

Each of Plants 1, 2, and 3 is shown in Fig. 1 as consisting of two portions, each of which is designated generally by a suitably labelled rectangle. One of these two portions is a computing and load assigning apparatus portion which is constructed, arranged, and operative in accordance with the present invention, while the other of the two portions represents the remainder of the corresponding plant and includes the plant generators, turbines, boilers, etc. The computing and load assigning apparatus portions for Plants 1, 2, and 3 are respectively identified by the numerals 3, 4, and 5, while the remainder of each of Plants 1, 2, and 3 is designated by a corresponding one of the numerals 6, 7, and 8.

The respective outputs 9, 10, and 11 of Plants 1, 2, and 3 are shown as being connected to the remainder of the system in the usual manner. Each of these outputs is controlled or assigned, in accordance with the present invention, by means of the corresponding one of the computing and load assigning portions 3, 4, and 5. In other words, the magnitude of the output of each plant, or of the plant load, is determined and assigned at each plant by the corresponding computing and load assigning apparatus at the plant.

Since the computing and load assigning apparatus located at each of Plants 1, 2, and 3 is constructed and operative in accordance with the present invention, this apparatus assigns the load to the corresponding plant as necessary to maintain the plants in economic balance, to secure the most economical combination of plant loadings, and to provide the most economical operation of the system. Thus, the computing and load assigning apparatus at each plant is operative to effect such economic loading of the plant in accordance with the novel reference point comparison method of the invention as described hereinbefore. To this end, the computing and load assigning apparatus at each plant is supplied with a first voltage or signal having the phase of the bus voltage of the corresponding plant, and with a second signal having the reference phase of the voltage at the common chosen reference point of the system. Said first or plant bus voltage phase signal for each of Plants 1, 2, and 3 is supplied to the respective one of the portions 3, 4, and 5, from the respective one of the plant outputs 9, 10, and 11, over a corresponding one of paths 12, 13, and 14. The second or reference phase signal supplied to each of the portions 3, 4 and 5 is the aforementioned single, common reference signal which is supplied to all of the plants and which has the same phase at all plants. In accordance with the invention, this reference phase signal is supplied to all plants, as by telemetering channels 15, from the dispatching office 1.

It will be remembered that, according to one aspect of the present invention, the phase of the common reference signal sent to the system plants is varied in accordance with the deviation, if any, between the desired or scheduled system condition values and the actual or existing values of these conditions. The purpose of so varying the phase of the common reference signal is to permit this signal to be utilized as a means by which the plant outputs can be changed as necessary to eliminate any deviations between the actual and desired system condition values, or system schedule deviations, while at the same time maintaining the most economical distribution of the system load among the plants.

To the end of providing the operation just described, the dispatching office 1 is supplied with three types of information for use in producing the common reference signal. Thus, signals representing the actual values of the system conditions, such as the value of the existing system frequency and the values of existing tie line loads, are supplied to the dispatching office 1 from the necessary points in the system, as by means of the illustrated telemetering channel 16. Also supplied to the dispatching office 1 is information as to the desired or scheduled values of the system conditions, as shown in Fig. 1 by the dotted path 17. Finally, a reference voltage is supplied to the dispatching office 1 by means of the path 18, from which the apparatus included in the dispatching office derives the common reference signal on the basis of any deviation between the actual and desired values of the system conditions. This reference voltage may be obtained from any convenient source of voltage which is in synchronism with the system. It is desirable that this source provide a supply of reference voltage which has a reasonably stable phase.

OPERATION OF THE FIG. 1 ARRANGEMENT

As was noted hereinbefore, the purpose of equipping the system of Fig. 1 with the illustrated economic load assigning and controlling apparatus according to the present invention is to obtain the automatic control of the outputs of Plants 1, 2, and 3 of the system as necessary to fulfill the load and frequency requirements of the system in the most economical manner. In other words, it is the purpose of the Fig. 1 load assigning apparatus as a whole to assign to the plant loads or outputs the values necessary to cause the total amount of generated power in the system to be that necessary to meet the existing needs of the system, and to cause this total generated power to be so divided or proportioned among Plants 1, 2, and 3 as to provide the most economical combination of plant loadings, and operation of the system at a minimum total cost of delivered energy, and hence in the most economical manner.

In achieving the foregoing desired operation and results, each of the computing and load assigning apparatus portions 3, 4, and 5 is operative to assign the load to the corresponding plant, or, more particularly, to control the output of the corresponding plant, as dictated by the phase of the common reference signal and in accordance with the existing incremental cost of delivered energy for the plant. One of the objects of this control is to maintain the outputs of the plants at the values necessary to cause the plants to operate with equal incremental costs of delivered energy, and hence to keep the plants in economic balance, for the existing load conditions. The other object of this control is to change the plant outputs, upon a change in the phase of the common reference signal, so as to correct the total system generation as necessary to eliminate the schedule deviation condition which caused the reference signal phase change, while at the same time assigning this new total plant output among the plants in accordance with their existing relative incremental delivered energy costs to the end of re-establishing equality between these costs and maintaining the plants in economic balance for the new operating conditions.

In accordance with the foregoing, each of the computing and load assigning portions 3, 4, and 5 is operative in accordance with the foregoing reference plant comparison method and economic balance Equation 4 to determine continuously whether or not the corresponding plant is in economic balance with the chosen reference point, and to effect automatically the necessary change in the plant output to return the plant to economic balance if the effected economic balance determinations indicate that the plant is not in economic balance. Specifically, each of the portions 3, 4, and 5 computes the incremental transmission loss ratio for the corresponding plant on the basis of the phase angle between the reference signal and the plant bus voltage, and also computes the corresponding incremental generating cost ratio for the plant on the basis of the plant operating level and the plant operating cost. The apparatus at each plant effects a continuous comparison between these loss and cost ratios according to Equation 4, and detects any economic unbalance between the plant and the reference point by detecting any deviation between the above loss and cost ratios. On occurence of such deviation, the apparatus operates in accordance with this deviation to change the plant output as necessary to reduce this deviation to zero, to satisfy the balance equation, and to return the plant to economic balance with the reference point. Since this operation takes place continuously at all of the three system plants, whereby each of the plants is controlled to be in economic balance with the reference point, it is apparent that this operation causes all of the plants to be in economic balance with each other.

As long as the requirements of the system are met by the existing generation supplied by Plants 1, 2, and 3, the phase of the common reference signal remains constant. This signal serves at such time to coordinate the economic balance comparisons effected at each plant by the corresponding computing and load assigning apparatus at the plant. In other words, the common reference signal under these conditions correlates the computations and comparisons made at the plants, since it represents, by its identical phase at each plant, the basis or reference point value with which each plant is compared in order to determine whether the plants are in economic balance with each other. As a result, changes in system load pattern or other system conditions which cause a departure from economic balance between the plants, even though no schedule deviation is produced, result in deviations at the plants from balance between the plants and the common reference signal. Such deviations cause the necessary changes to be effected in the plant outputs as required to eliminate the deviations and to return each plant to the condition of economic balance with the reference point, and hence to re-establish the condition of economic balance between all of the plants.

Upon the occurrence of a schedule deviation in the system, the resulting change in the phase angle of the common reference signal at each plant causes the production of deviation effects between the plants and the reference signal which are not eliminated until the plant outputs have been changed as necessary to offset the system conditions producing the schedule deviation, and until the condition of economic balance has been re-established between the plants for the new system conditions.

THE APPARATUS OF FIG. 2

Fig. 2 illustrates the details of apparatus embodying the present invention which can be used to advantage as the computing and load assigning apparatus at each of the plants of the Fig. 1 arrangement. Thus, Fig. 2 illustrates a desirable form which each of the apparatus portions 3, 4, and 5 of Fig. 1 may take. For purposes of description and explanation, it will be considered that the computing and load assigning apparatus of Fig. 2 is the apparatus 3, which is individual to Plant 1. It should be noted, however, that each of the apparatus portions 4 and 5 of the respective Plants 2 and 3 can also advantageously be of the form of the Fig. 2 apparatus, if desired. In other words, the apparatus shown in Fig. 2 is suitable for use as any of the apparatus portions 3, 4, and 5 shown generally in Fig. 1, but is treated herein as being the apparatus portion 3 for the purpose of simplifying the description of the invention.

In Fig. 2, the portion 6 of Plant 1 is shown as including a first generating unit 19 and a second generating unit 20. While there may be one or more additional generating units at Plant 1, only the two units 19 and 20 are shown in Fig. 1, this being done for the purpose of preventing undue complexity of the drawings and description. It is to be noted, however, that the load assigning apparatus 3 to be described, could be arranged to control as many generating units in the plant as desired, and that the operation of this apparatus would be the same for any number of units as it is in connection with the two units illustrated in Fig. 2.

The apparatus 3 of Fig. 2 includes a phase angle determining portion 21, a computing, comparing, and generator load controlling portion or section 22 for generating unit 19, and a section 23 which is identical to the section 22 but is individual to the generating unit 20. The apparatus of Fig. 2 would also include an additional section, not shown, for each additional generating unit at Plant 1, each of these additional sections being identical to the illustrated sections 22 and 23 for units 19 and 20 respectively.

The general purpose of the sections 22 and 23 collectively is to control the outputs of the associated generating units 19 and 20, and hence the total plant output, as necessary to maintain Plant 1 in economic balance with respect to the common reference point $o$, and hence in economic balance with Plants 2 and 3. To this end, each of the sections 22 and 23 is arranged to control the output of its corresponding generating unit to the value which causes the economic balance equation for that generating unit to be satisfied. This necessitates that each of the sections 22 and 23 be supplied with an effect which is representative of the existing value of the phase angle $\theta_{1-o}$ between the plant 1 bus voltage and the common reference signal, since the economic balance equations are functions of this angle, as explained hereinbefore. This effect representative of the existing value of the phase angle $\theta_{1-o}$ is supplied to each of the sections 22 and 23 by the phase angle determining portion 21.

For the purpose of simplifying the following detailed description of the section 22, this description treats the operation of the section 22 and the unit 19 controlled thereby as if the output of the unit 19 is the entire output of Plant 1, and as if Plant 1 is in economic balance as long as the economic balance equation for unit 19 in section 22 is satisfied. In other words, the present description of the section 22 treats this section as though it and the unit 19 controlled by it make up the entire Plant 1. Such an approach is proper and accurate, since the operation of the section 22 represents or portrays the operation of all of the other corresponding sections of the Plant 1 control equipment, and since the economic balance status of the output of unit 19 is an accurate representation of the status of the outputs of the other plant units and of the plant output. The reason for this is that the operation of the other units of Plant 1, under the control of their respective control sections, follows or parallels the operation of the unit 19 under the control of the section 22. Accordingly, the operation, output, and economic balance status of any one of these units and sections, such as the unit 19 and section 22 chosen for illustrative purposes, actually give a true and accurate picture of the operation, output, and economic balance status of the entire Plant 1.

The section 22

The specific purpose of the section 22 is to compute the existing values of the incremental transmission loss and incremental generating cost ratios of Equation 4 associated with the operation of generating unit 19, and to utilize these ratios in determining, in accordance with Equation 4, whether or not generating unit 19, and hence Plant 1, are operating in economic balance with respect to the other generating units at Plant 1, the common reference point, and the remaining Plant 2 and 3 of the system, section 22 is also arranged to assign or control the output of generating unit 19 as necessary to maintain equality between the corresponding loss and cost ratios, and hence as necessary to maintain the economic balance comparison equation satisfied for generating unit 19, to the end of maintaining Plant 1 in economic balance with Plants 2 and 3.

In accordance with the foregoing, the section 22 includes a computing and comparing bridge circuit having input or energizing terminals 24 and 25, and having output terminals 26 and 27. A first adjustable resistor 28, the body of a slide wire resistor 29, and a second adjustable resistor 30 are connected in series in the order stated in a first branch between the energizing terminals 24 and 25. The adjustable contact 31 of the slide wire resistor 29 is connected to the bridge output terminal 26.

Adjustable resistors 32 and 33 are connected in series in a second branch between the energizing terminals 24 and 25, the junction between these resistors forming the bridge output terminal 27. Thus, the bridge circuit is made up of the adjustable resistors 28, 30, 32 and 33 and the slide wire resistor 29. The energizing terminals 24 and 25 are arranged, as shown, to be connected to a suitable source of direct energizing voltage, not shown.

Loss ratio computation

The purpose of the first or upper branch of the bridge circuit of section 22 is to compute the existing value of the incremental transmission loss ratio of Equation 4 for section 22, and to produce a potential or signal which is proportional in magnitude to this value. To this end, the adjustable resistors 28 and 30 of the bridge circuit are employed for introducing into the bridge circuit, and the computations made thereby, the existing numerical value of the constant reactance-resistance ratio for Plant 1, $K_{1-o}$. For this purpose, the respective adjustable contacts 34 and 35 of these two resistors are mechanically ganged together, and are arranged to be adjusted along their respective resistors to a position representative of the existing value of $K_{1-o}$. Specifically, the contacts 34 and 35 are arranged to be manually positioned through a suitable mechanical linkage 36 by means of knob 37. A scale and pointer arrangement cooperating with the knob 37 facilitates the proper manual adjustment of the effective resistances of the resistors 28 and 30 in accordance with the numerical value of the constant $K_{1-o}$, in a manner which is described in detail hereinafter.

The slide wire resistor 29 is employed for introducing into the bridge circuit, and the computations which it effects, the existing numerical value of the phase angle $\theta_{1-o}$ between the bus voltage of Plant 1 and the reference voltage. To this end, the contact 31 is arranged to be positioned along the slide wire 29 in accordance with this phase angle value. This is done by means of a suitable mechanical linkage 38 which is actuated by the phase angle determining portion 21, to be described hereinafter. It is sufficient to note at this point that the slide wire 29 is a so-called zero center device, and that the portion 21 positions the contact 31 on the slide wire 29 to the right of the zero position when the plant bus voltage leads the reference signal and $\theta_{1-o}$ is thus positive and positions the contact 31 to the left of the zero position when the bus voltage lags the reference signal and $\theta_{1-o}$ is thus negative. Moreover, the portion 21 so positions the contact 31 on the slide wire 29 that the distance of the contact from the zero center position at any time is a measure of the existing value in electrical degrees of the phase angle $\theta_{1-o}$. Therefore, the position of the contact 31 on the slide wire 29 is a measure of both the magnitude and sense or sign of the existing phase angle $\theta_{1-o}$.

By virtue of the foregoing, the upper bridge branch including the K resistors 28 and 30 and the phase angle slide wire 29 computes and provides the effect or signal which is proportional in magnitude to the existing numerical value of the right-hand, incremental transmission loss ratio term of balance comparison Equation 4. As noted hereinbefore, the magnitude of this loss signal is a function of solely $K_{1-o}$ and $\theta_{1-o}$, being a linear function of $\theta_{1-o}$. This loss signal appears on the contact 31, and hence on the bridge output terminal 26, and is of a value, with respect to a point midway in potential between the bridge energizing terminals 24 and 25, which is proportional to the existing numerical value of the loss ratio term of Equation 4.

Cost ratio computation

The second or lower branch of the bridge circuit of section 22, containing the adjustable resistors 32 and 33, is provided for the purpose of computing the existing value of the incremental generating cost ratio of Equation 4 for section 22, this cost ratio being equal in value to the foregoing loss ratio when unit 19, and hence Plant 1, are in economic balance with respect to the reference point $o$ and the Plants 2 and 3. Also, the purpose of this lower bridge branch is to produce a potential or signal which is proportional in magnitude to the value of this cost ratio, which is equal to the value of the above described loss signal when economic balance conditions for Plant 1 exist, and which is arranged to be compared with said loss signal in order to detect any economic unbalance for Plant 1.

To this end, the adjustable resistor 32 is employed for introducing into the bridge circuit, and the computations made thereby, the value of the arbitrary reference generating cost $F_o$. Specifically, the contact 39 of the resistor 32 is arranged to be manually positioned along the resistor 32 through a suitable mechanical linkage 40 by means of a knob 41. A scale and pointer arrangement cooperating with the knob 41 facilitates the proper manual adjustment of the effective resistance of the resistor 32 in accordance with the numerical value of the arbitrary generating cost $F_o$ for the reference point $o$.

The specific manner in which this adjustment may desirably be made in practice will be set forth in detail hereinafter.

The adjustable resistor 33 is employed for introducing into the bridge circuit and its computations the value of the incremental generating cost $dF/dP$ for the generating unit 19. Thus, the effective resistance value of the resistor 33 is arranged and controlled to be proportional to the value of this incremental generating cost. This requires that the resistance of the resistor 33 be proportioned in accordance with a design value for the price or cost of fuel at Plant 1, and that the effective resistance of the resistor 33 be adjusted in accordance with the output of the unit 19, or, more specifically, in accordance with the incremental input of cost required to produce an incremental output of power at the existing output of the unit 19 at any given time.

The foregoing is accomplished in the Fig. 2 apparatus by means of a cam and follower combination 42—43 which positions an adjustable contact 44 along the resistor 33 through a suitable mechanical linkage 45. The cam 42 is shaped in accordance with the boiler-turbine input-output characteristic for the unit 19, and is arranged to be positioned by the turbine valve shaft of the turbine of the unit 19. This causes the contact 44 to be positioned on the resistor 33 in accordance with the output of the unit 19, and, more specifically, in accordance with the incremental input of cost for Plant 1 required to produce an incremental output of power at the existing output of unit 19.

In the above manner, the effective resistance of the resistor 33 is made to be proportional to the incremental generating cost for the unit 19. As will be discussed further hereinafter, the reference generating cost resistor 32 is desirably utilized as a means for permitting this incremental generating cost value produced in the apparatus to be compensated for changes in the cost of fuel at Plant 1 from the cost assumed in proportioning the resistor 33, and for changes which affect the operating efficiency of the unit 19 and its associated equipment, and hence cause the unit to operate with a different characteristic from that on which the design of the cam 42 was based.

If desired, the positioning of the contact 44 in accordance with the output of the unit 19 can be arranged to be effected by other than the turbine valve shaft as illustrated by way of example in Fig. 2. Thus, if desired, the cam 42 can be arranged to be positioned by means directly responsive to the actual unit output. Further, by employing as the resistor 33 a resistor which is characterized in accordance with the desired input-output characteristic, the need for the cam and follower arrangement 42—43 is eliminated. Such a resistor may be wound to have the desired characteristic, or may well be of the known type wherein the characterization is adjustable by suitable means.

By virtue of the foregoing, the lower bridge branch including the resistors 32 and 33 computes and provides the effect or signal which is proportional in magnitude to the existing value of the left-hand, incremental generating cost ratio term of Equation 4 for section 22. This cost signal appears at the bridge output terminal 27, and is of a value, with respect to a point midway in potential between the bridge energizing terminals 24 and 25, which is proportional to the existing numerical value of the cost ratio term of Equation 4. This cost signal is equal in value to the foregoing loss signal when economic balance conditions exist for unit 19 and Plant 1, at which time there is no potential difference between the bridge output terminals 26 and 27.

*Balance deviation detection and load control*

As was previously noted, the section 22 effects a continuous comparison between the foregoing incremental transmission loss and generating cost ratio signals so as to detect any deviation between these signals, and hence any deviation between the corresponding cost and loss ratios, any such deviation being representative of a deviation from economic balance for Plant 1. This signal comparison is effected by comparing the signals or potentials produced on the bridge output terminals 26 and 27, or, more specifically, by comparing the potential of the terminal 26 with that of the terminal 27. This amounts to detecting the potential difference or potential, if any, produced between the terminals 26 and 27. The value of this potential or deviation signal is zero as long as the loss and cost signals and ratios are equal, and hence as long as Plant 1 is in economic balance.

For the purpose of effecting this economic balance comparison or this detection of the potential or deviation signal between the bridge output terminals 26 and 27, a suitable potential responsive device 46, shown as a zero-center galvanometer, is connected in series with a condenser 47 between the terminals 26 and 27. A first resistor 48 is connected across the galvanometer 46, and a second resistor 49 is connected across the condenser 47. The condenser 47 and the resistors 48 and 49 impart a rate response or rate action to the galvanometer 46 which will be described hereinafter.

By virtue of the foregoing connections, the galvanometer 46 detects, and is responsive to, the appearance of the foregoing deviation signal between the bridge output terminals 26 and 27. The resulting deflection of the galvanometer pointer is an indication of the departure of unit 19 and Plant 1 from economic balance, and is utilized for assigning the load to unit 19, or, more specifically, for controlling the output of unit 19, as necessary to return this output to a value which provides economic balance for unit 19 and Plant 1.

To this end, the galvanometer 46 is arranged to control the output of unit 19 and of Plant 1 as necessary to maintain zero potential difference between the bridge output terminals 26 and 27, and hence as necessary to maintain the loss and cost signals and ratios equal, the balance comparison equation satisfied, the bridge circuit balanced, and the Plant 1 in economic balance. Thus, the galvanometer 46 is advantageously of the well-known proportional controlling type, and is arranged to control the operation of a reversible, governor set point-adjusting motor 50 for the governor of the unit 19. Specifically, the galvanometer 46 controls the operation of the motor 50 through the usual relay 51, which is connected between the galvanometer 46 and the motor 50 by suitable conductors 52. The motor 50 adjusts the set point of the governor of unit 19 through a suitable mechanical linkage 53.

In the usual manner for such a combination of a proportional controlling galvanometer and a reversible motor, the motor 50 is caused to rotate in one direction when the galvanometer 46 detects a potential difference of one polarity between its terminals and hence deflects its pointer in one direction away from the zero center position. Similarly, the motor 50 is caused to rotate in the opposite direction when the galvanometer 46 detects a potential difference of the opposite polarity and hence deflects its pointer from zero in the opposite direction. In both cases, the speed of rotation of the motor 50, and hence the rate of change or adjustment of the governor set point, is proportional to the extent of the deflection of the galvanometer pointer from the zero center position, and to the magnitude of the potential across the galvanometer. When there is no potential across the galvanometer 46, the motor 50 is not actuated for rotation in either direction, whereby the governor set point thus remains in the position into which it was last adjusted by the motor 50.

Since the construction and operation of such a proportional controlling galvanometer operating a reversible motor is well known, no further description of the details of this combination is deemed to be necessary herein.

Operation of the section 22

When, and as long as, the operation or output of the generating unit 19 is such that this unit, and Plant 1, operate in economic balance with respect to the reference point and the other system plants, the economic balance Equation 4 for unit 19 is satisfied. This means that, under this condition, the incremental transmission loss and incremental generating cost ratios and signals for unit 19 are equal, and that there is thus no potential between the bridge output terminals 26 and 27. In other words, the presence of zero potential between the bridge output terminals is an indication that the output of unit 19 is that required to maintain Plant 1 in economic balance for the existing system conditions.

Under this condition, the pointer of the galvanometer 46 rests at the zero-center position, since there is no bridge output or economic balance deviation potential or signal to be detected at this time. Thus, the governor adjusting motor 50 is not actuated, and the output of unit 19 is not adjusted or changed, but continues at the value producing the economic balance condition.

A departure from economic balance for unit 19 and Plant 1, due to one or another cause, means that the existing output of unit 19 is no longer that required to produce and secure such economic balance. Upon the occurrence of such a departure, there is a departure from equality between the cost and loss ratios for unit 19, whereby balance Equation 4 is no longer satisfied. This results in a departure from equality between the cost and loss signals in the bridge circuit, and in the appearance of the deviation potential or signal between the bridge output terminals 26 and 27. Thus, the appearance of this deviation signal is an indication that unit 19 and Plant 1 are no longer in economic balance, or, in other words, that there is a deviation from such balance.

(1). The extent and direction of deviation from economic balance between Plant 1 and the reference point.

The deviation-from-balance signal which is produced between the bridge output terminals 26 and 27 under the presently described condition of departure from economic balance is of a magnitude and polarity which are respectively representative of each of the following:

(1) The extent and direction of deviation from economic balance between Plant 1 and the reference point.

(2) The amount and direction of the difference between the incremental costs of delivered energy for Plant 1 and the reference point.

(3) The extent and direction of the departure from the most economic loading for Plant 1 with respect to the reference point.

(4) The approximate amount and direction by which the output of unit 19, and hence the output of Plant 1, should be changed in order to return Plant 1 to economic balance and operation with an incremental delivered energy cost equal to a common minimum value for all of the system plants.

Thus, a value of other than zero for the deviation signal produced between the bridge output terminals 26 and 27 indicates a deviation or departure from economic balance for Plant 1, and indicates the need for adjustment of the output of unit 19 and Plant 1 in order to obtain the most economical loading of the unit and plant, and a condition of economic balance therefor.

The appearance of the deviation signal between the bridge output terminals 26 and 27 is thus indicative of the need for a change in the output of unit 19 in order to restore economic balance. Briefly, this signal, and hence the deviation from balance responsible for it, are detected by the galvanometer 46, which produces a pointer deflection of a magnitude and direction which are respectively dependent upon the magnitude and polarity or direction of the deviation signal and the departure from economic balance. This deflection of the galvanometer pointer actuates the governor set point adjusting motor 50 for rotation in the corresponding direction, this direction being that which causes the resulting change in the set point of the unit 19 governor to change the output of the unit in the direction necessary to return the unit and plant to the balanced condition.

More specifically, the presence of the aforementioned rate action condenser 47 and the resistors 48 and 49 associated with the galvanometer 46 cause the deviation signal to produce across the galvanometer 46 a potential which is proportional in magnitude to both the magnitude and the rate of change of the deviation signal, and which has a polarity corresponding to that of the deviation signal. Accordingly, since the extent of galvanometer pointer deflection in the corresponding direction is proportional to the magnitude of the potential across the galvanometer, the galvanometer pointer is actually deflected from zero by an amount which is proportional to both the magnitude and rate of change of the deviation signal. Thus, the speed or rate at which the motor 50 positions or adjusts the set point of the governor for unit 19 is proportional to both the magnitude and rate of change of the deviation signal, and hence is proportional to both the extent and rate of change of deviation from economic balance, since the speed of rotation of the motor 50 is proportional to the amount or extent of deflection of the galvanometer pointer from zero.

It is noted that, if desired, the means for controlling the direction and speed of rotation of the governor motor 50 in accordance with the polarity, magnitude, and rate of change of the deviation signal may be of forms other than the proportional controlling and rate responsive galvanometer arrangement shown herein by way of example. Thus, this means could well be of the form of any of the known so-called proportional plus reset controllers which are available on the market. Also, if desired, other means, such as pneumatic or hydraulic motors, could be used in place of the motor 50 to control the governor or the output of unit 19. Control apparatus applying generation or output raising and lowering impulses to the governor could also be employed, if desired. The particular type of control equipment to be used for any given situation depends on the factors and conditions particular to that situation.

As is readily apparent from the foregoing, the section 22 assigns or controls the output of generating unit 19 in accordance with a measure of the extent and direction of deviation from economic balance for unit 19 and Plant 1, and of the extent and direction of deviation from equality between the incremental costs of delivered energy for the systems plants. This assignment or control of the generation of unit 19 is performed as necessary to maintain equality between the cost and loss ratios for unit 19, to maintain the economic balance equation for this unit satisfied, to maintain Plant 1 in economic balance with the other system plants, and to maintain equality between the incremental costs of delivered energy for the plants.

The section 23

As was noted previously herein, the section 23 is identical to the section 22 as just described, but is individual to the generating unit 20 at Plant 1. Accordingly, the section 23 is arranged and operative to control the output of generating unit 20 to the end of maintaining the operation of this unit in the manner necessary to keep Plant 1 in economic balance with the other system plants. This operation is identical to that described above in connection with operation and control of the section 21 and the unit 19. Therefore, it is sufficient to note with respect to the section 23 that the latter includes components and connections which are identical to the corresponding components and connections included in the section 22, and that these items in the section 23 bear reference characters which are the same as those applied to the corresponding items in the section 22 except for being in the two-hundreds series.

It is noted in connection with the section 23 that the K resistor contacts 234 and 235 thereof are advantageously arranged to be adjusted along their respective resistors 228 and 230 by the linkage 36. Accordingly, these contacts are adjusted simultaneously with the adjustment of the corresponding K contacts in section 22 as the common $K_{1-0}$ knob 37 is rotated. Also, the linkage 36 is shown as extending downwardly in Fig. 2 so as to be available to position the K resistor contacts in the additional computer circuits or sections included for controlling any other generating units at Plant 1. Such use of a common adjusting means for all of the K resistors at Plant 1 is permissible because of the fact that the numerical value of $K_{1-0}$ is a constant pertaining to the entire plant and is the same for all sections and generating units at the plant.

It is also noted in connection with the section 23 that the phase angle slide wire resistor contact 231 thereof is advantageously arranged to be adjusted along the resistor 229 by the linkage 38, whereby this contact is adjusted by the phase angle determining portion 21 simultaneously with the adjustment of the corresponding contact 31 in the section 22. Also, the linkage 38 is shown as extending downwardly in Fig. 2 so as to be available to position the phase angle resistor contacts in the control section for any additional units at Plant 1. The use of a single means for effecting the simultaneous and identical adjustment of all of the phase angle resistor contacts at Plant 1 is permissible because of the fact that the numerical value of $\theta_{1-0}$ is the same at any given time for all of the sections and units at Plant 1.

The portion 21

As has been explained above, the purpose of the phase angle determining portion 21 is to supply to each of the control sections 22 and 23, and any other such sections at Plant 1, an effect which is representative of the existing value of the phase angle $\theta_{1-0}$ between the Plant 1 bus voltage and the common reference signal. More specifically, it has been explained above that the phase angle resistor contact 31, 231, etc. in each control section is positioned along its corresponding resistor, in accordance with the existing numerical value and sign of $\theta_{1-0}$, by means of the common mechanical linkage 38. The manner in which this linkage is actuated to so adjust the phase angle resistor contacts will now be described.

The portion 21 includes a telemetering receiver 54, a phase angle measuring or determining device 55, and a servo arrangment including a follow-up circuit 56, an amplifier 57, and a follow-up motor 58. The receiver 54 receives the common reference signal which is telemetered to Plant 1 from the dispatching office 1 of Fig. 1, and converts this telemetered signal into the reference phase signal for use at Plant 1. This signal has a phase which is the same as that of the reference signal at each of the other system plants, and which represents the reference phase of the voltage at the common reference point o.

The phase of the reference signal produced by the receiver 54 is compared with the phase of the Plant 1 bus voltage by the device 55, the output of which is a D. C. signal having a magnitude and polarity which are respectively dependent upon the magnitude in electrical degrees and the sign of the phase angle $\theta_{1-0}$ by which the plant bus voltage leads the reference signal. This output of the device 55 is converted by the servo elements 56, 57, and 58 into a proportional position which is transmitted by the linkage 38 to each of the phase angle resistor contacts, whereby each of these contacts is accurately positioned in accordance with the value and sign of $\theta_{1-0}$.

Specifically, the signal of reference phase from the output terminals 59 of the receiver 54 is applied by a pair of conductors 60 to the terminals 61 of one of the inputs of the phase measuring device 55. The conductors 12 apply the signal of the phase of the plant bus voltage to the terminals 62 of the other input of the device 55. The D. C. output signal from the output terminals 63 of the device 55 is connected in series with an adjustable D. C. output from the follow-up circuit 56 to the input terminals 64 of the servo amplifier 57. This latter is accomplished by means of a conductor 65 which connects one of the output terminals 63 to one of the input terminals 64, a conductor 66 which connects the other of the output terminals 63 to one of the output terminals 67 of the circuit 56, and a conductor 68 which connects the other output terminal or slide wire contacts 69 of the circuit 56 to the other of the input terminals 64.

The output terminals 70 of the amplifier 57 are connected by conductors 71 to the motor 58, which in turn is arranged to adjust the output of the circuit 56 by positioning its contact 69 through the linkage 38. The motor 58 positions the servo contact 69 in the manner necessary to maintain zero input to the amplifier 57, which results in the positioning of this contact in accordance with the value and sign of $\theta_{1-0}$. Accordingly, the phase angle resistor contacts 31 and 231 are likewise positioned by the motor 58 and the linkage 38 in accordance with the value and sign of $\theta_{1-0}$.

The phase measuring device 55 may be of any of the well known forms of this type of device which are available on the market. Since the construction and operation of such devices is well known, no further reference to the device 55 is seen to be necessary herein.

The servo arrangement including the elements 56, 57, and 58 may also be of any of the well known forms of such apparatus which are available on the market, and may well be of the type disclosed in the Wills Patent No. 2,423,540. Since the manner in which such servo arrangements are constructed and are operative to position a contact, such as the contact 69, in accordance with the magnitude and polarity of a D. C. signal, such as the output of the device 55, is well known, no further description of the present servo arrangement is seen to be necessary herein.

It is noted that the phase angle determining portion 21 need not be of the specific form illustrated by way of example in Fig. 2, but instead may be of any suitable desired form which will effect the positioning of the phase angle resistor contacts 31 and 231 in the specified manner. The specific form chosen for the portion 21 for any given situation will depend upon the conditions particular to that situation.

It is assumed in connection with the showing of the Plant 1 equipment of Fig. 2 that the line connections to this plant are such that a single phase angle $\theta_{1-0}$ and a single reactance-resistance ratio $K_{1-0}$ are applicable to all of the generating units in the plant. If, however, Plant 1 were to have a split bus supplying two or more distinctly different lines, and if there were a substantial difference between the phase angles of the voltages of two different sections of the plant bus relative to the reference signal, a separate phase angle determining portion for each of these different phase angles would be required. In such a case, each phase angle determining portion would adjust the phase angle resistor contacts for only those generating units which feed the bus section having the phase angle applied to that portion. Such a case would also require the use of separate K resistor-adjusting knobs for each bus section having a substantially different K ratio. Each of such knobs would adjust the K resistor contacts for only those units supplying the bus section having the corresponding K ratio. These cases would represent the equivalent of having at the same physical location two or more electrically separate plants.

OPERATION OF THE FIG. 2 APPARATUS

Initial adjustments

In the practical utilization of the Fig. 2 apparatus as the controlling portion for Plant 1 of the Fig. 1 system, the K resistors 28, 30, etc. must be properly adjusted initially in accordance with the actual, numerical value of the constant ratio $K_{1-o}$, as was mentioned hereinbefore. In other words, the knob 37 must be initially manually positioned as necessary to make the effective resistances of the resistors 28, 30, etc. all equal to a particular resistance value which is individual to, or corresponds to, the particular numerical value of $K_{1-o}$. Such initial setting of the proper K resistance value into the Fig. 2 apparatus is required in order to cause the balance deviation signals to be zero when Plant 1 is actually in economic balance.

The proper resistance value T for the K resistors 28, 30, etc. corresponding to the existing value of K can be determined mathematically for any given arrangement by developing a suitable equation relating T and K. The following is the derivation of such an equation, from which the value of T can be readily determined for any given value of K.

If the resistance of one half of the entire phase angle slide wire resistor 29 is designated as S, and if it is assumed that the span of the adjustment of the contact 31 along the entire length of the resistor 29 covers sixty electrical degrees on each side of the zero center position, the balance equation for the bridge circuit of section 22 can be written as:

$$\frac{dF_n/dP_n - F_o}{dF_n/dP_n + F_o} =$$

$$\frac{[T + S(1 - \theta/60)] - [T + S(1 + \theta/60)]}{2T + 2S} = -\frac{S\theta}{60(T+S)} \quad (5)$$

Substituting Equation 5 into the economic balance Equation 4 gives:

$$\frac{S\theta}{60(T+S)} = \frac{0.0184K}{K^2 + 0.17} \theta$$

$$SK^2 - 1.104SK + 0.17S = 1.104KT$$

$$\frac{T}{S} = \frac{K^2 - 1.104K + 0.17}{1.104K} \quad (6)$$

With any convenient design value chosen for and assigned to S, Equation 6 provides the proper resistance value setting T for resistors 28, 30, etc. as a function of the value of the ratio K.

Another initial adjustment which must be made to the Fig. 2 apparatus is the proper setting of the reference generating cost resistors 32, 232, etc. in the respective sections 22, 23, etc. All of these resistors are initially set manually, by means of their corresponding knobs, to have equal effective resistances, the valve of this common resistance being representative of the chosen arbitrary value $F_o$ of the generating cost at the common reference point $o$. Similarly, all of the equivalent $F_o$ resistors at Plants 2 and 3 are initially set to have this common value of resistance. This gives the original basis on which all plants are compared to a common point, and hence are compared to each other.

As was mentioned previously herein, the reference generating cost resistor for each generating unit, such as the resistor 32 for unit 19, is desirably utilized as a means for permitting the incremental generating cost value produced in the corresponding section to be compensated for changes in the cost of fuel at the plant from the cost originally assumed in proportioning the corresponding incremental generating cost resistor, such as the resistor 33. Each generating cost resistor is also desirably utilized to compensate the corresponding computed incremental generating cost value for changes which affect the operating efficiency of the corresponding generating unit and its associated equipment, and which hence cause the unit to operate with a different characteristic from that on which the design of the corresponding characterized cam was based. Thus, the reference generating cost resistor for each generating unit is desirably utilized as a means for taking into account the effects of changes which affect the established relationship between the effective resistance of the corresponding incremental generating cost resistor and the output of the corresponding generating unit.

In accordance with the foregoing, the setting or effective resistance value of the resistor 32 is desirably changed in practice, from the original common $F_o$ value to which all of such resistors were initially set, as necessary to take into account any changes in the cost of fuel at Plant 1 for unit 19, and to allow for changes in condenser back pressure, boiler slagging, condition of fuel, turbine clearances, and any other factors which affect the efficiency of the unit 19. Similarly, the setting of the resistor 232 is desirably changed in the above manner to compensate for any of the above changes which affect generating unit 20. It is desirable to provide such a separate adjustment for the $F_o$ resistor of each unit since conditions affecting one unit do not always affect the other units in the same manner or at all, and hence do not always require the same corrective setting to be made to all of the $F_o$ resistors.

Operation

When and as long as the scheduled system requirements, such as tie line loads and system frequency, are met by the existing system generation, the phase of the common reference signal at Plant 1, and at each of the other plants remains constant. Under this condition, no changes in the governor settings or the generating unit outputs are made at Plant 1 or at any of the plants as long as all of the plants are loaded in the most economical manner and hence are in economic balance.

The occurrence of any change, at Plant 1 or elsewhere, which causes Plant 1 to deviate from economic balance, causes operation of the governor motors 50 and 250, and readjustment of the outputs of units 19 and 20, and any other units at Plant 1, as necessary to restore Plant 1 to economic balance with the other plants. Such restoration may also involve the changing of the outputs of one or both of the other system plants. All of this may occur, however, without any departure from the scheduled system requirements, and hence without any change in the phase of the common reference signal.

Moreover, the occurrence of changes in system load pattern, which may occur while the total system requirements remain satisfied, will result in increases in the output of one or more of Plants 1, 2, and 3, and/or decreases in the output of one or more of these plants, as necessary to restore between the plants the economic balance which was disrupted by the load pattern change. Also, the interruption of a transmission line will change the relative bus voltage phase angles at one or more of the plants, will temporarily destroy the economic balance between the plants, and will hence result in the adjustment of the plant outputs as necessary to restore economic balance. Such operation will always be such as to reduce the emergency loadings on the remaining lines, thus aiding system stability and minimizing thermal overloading.

Upon any of the foregoing or other occurrences which cause Plant 1 to depart from economic balance with respect to the reference point and the other plants, the resulting operation or rotation of the governor-adjusting motors 50, 250, etc. is reduced or terminated in each of sections 22, 23, etc. in the following two ways, each of which reduces the deviation signals across the galvanometers:

(1) The resultant opening or closing of each turbine valve, resulting from the operation of the corresponding governor motor, changes the effective resistance of the corresponding incremental generating cost resistor in the direction to rebalance the corresponding bridge circuit.

(2) The resulting increase or decrease in the plant output, due to the adjustment of each of the turbine valves, changes the bus voltage phase angle of the plant, and causes the corresponding phase angle resistor contact to be adjusted in the direction to rebalance the corresponding bridge circuit.

Upon the occurrence of a change in the system which results in a deviation between the desired or scheduled system condition values and the actual, existing values of these conditions, the phase of the common reference signal is advanced or retarded, depending on the direction of the deviation. For example, an increase in system load, resulting in a schedule deviation requiring an increase in system generation, causes the phase of the reference signal at all plants to be advanced. This in turn unbalances the bridge circuits at the plants and results in the application of output raising governor adjustments to those units operating near the raise sides of the dead bands of their governor motor controllers.

As in the case described above, such governor motor operation is reduced or terminated by the resulting changes produced in the effective resistances of the incremental generating cost resistors, and by the resulting changes produced in the positions of the phase angle resistor contacts by the resulting changes in the phase angles of the plant bus voltages. Each of these changes is in the direction to rebalance the bridge circuits at the plants. Also, in this case, the resulting increase in system generation may cause the phase angle of the reference signal to be retarded at each plant, resulting in a further adjustment of the phase angle resistor contacts in the direction to rebalance the bridge circuits.

A change in system conditions resulting in a schedule deviation requiring a decrease in system generation causes the phase of the reference signal at each plant to be retarded. This in turn causes the outputs of the appropriate plants to be reduced, such reductions again serving to produce effects in the direction to rebalance the bridge circuits and reduce to zero the deviation signals. In each case, the plant loads are assigned and reassigned until the system requirements are met, and until the plants are loaded in the most economical manner and hence operate in economic balance with each other.

It should be noted that it is not necessary to provide automatic load control at all of the system plants, or for all of the generating units at any one plant. Thus, if desired, manual economic loading can be employed at one or more plants or for one or more units at a given plant. Such manual control can be effected by controlling manually the outputs of the chosen plants or units in accordance with the observed deviation indications provided by the bridge output galvanometers, as necessary to reduce these deviations to zero. Alternately, the reference signal received at a chosen plant can be utilized to actuate an indicating phase meter showing the phase angle by which the plant bus voltage leads the reference signal. The plant units can then be loaded manually by the use of tables which indicate the economic loading for each unit for each value of said phase angle.

THE APPARATUS OF FIG. 3

Fig. 3 illustrates the details of apparatus according to the present invention which can be used to advantage at the dispatching office 1 of the Fig. 1 arrangement for advancing and retarding the phase of the common reference signal in accordance with system schedule deviations. As shown, the apparatus at the dispatching office 1 includes a telemetering receiver 72 which receives the data as to the actual values of the system conditions as telemetered to the office 1 over the channel 16. Also included at the office 1 is a schedule deviation detector 73 which positions a contact 74 along a schedule deviation slide wire resistor 75 through a suitable mechanical linkage 76 in accordance with the magnitude and direction of any deviation between the actual and scheduled values of the system conditions. To this end, the output of the receiver 72 is applied to the deviation detector 73, as is the data as to the scheduled values of the system conditions supplied over the path 17. Since the construction and operation of such schedule deviation detectors is well known, no further description of the detector 73 is deemed to be necessary herein.

The deviation resistor 75 is included in a bridge circuit 77, the output of which controls the operation of a reversible motor 78. This motor operates through a suitable mechanical linkage 79 to adjust a phase shifter 80 which in turn changes the phase of the common reference signal as long as the motor 78 is rotating and hence as long as there is a schedule deviation detected by the detector 73. To this end, the reference voltage supplied to the office 1 over the path 18 is applied to the input terminals 81 of the phase shifter 80, while the common reference signal is taken from the phase shifter output terminals 82 and is fed by conductors 83 to the input terminals 84 of a telemetering transmitter 85 for transmission over the channel 15 to the Plants 1, 2, and 3.

In addition to the deviation resistor 75, the bridge circuit 77 includes input or energizing terminals 86 and 87 between which the resistor 75 is connected, and also includes resistors 88 and 89 which are connected in series between the energizing terminals 86 and 87. The latter are arranged to be connected to a suitable source of energizing voltage, not shown. A first bridge output terminal 90 is connected to the contact 74 of the resistor 75, and a second bridge output terminal 91 is formed by the junction of the resistors 88 and 89.

The motor 78 is controlled by a galvanometer 92 which is connected between the bridge output terminals 90 and 91, and which controls the motor 78 in accordance with the output of the bridge 77 in the same way that the motor 50 of the Fig. 2 apparatus is controlled by the galvanometer 46 in accordance with the output of its bridge circuit. Thus, the galvanometer 92 is also of the zero-center, proportional control type, and is connected between the bridge circuit output terminals 90 and 91 in series with a condenser 93. A resistor 94 is connected across the galvanometer 92, and a resistor 95 is connected across the condenser 93. As in the case of the galvanometer 46 of Fig. 2, the condenser 93 and resistors 94 and 95 cooperate with the galvanometer 92 to cause the pointer deflection thereof to be proportional to both the magnitude and the rate of change of the bridge output signal. Thus, the deflection of the pointer of the galvanometer 92 is proportional to both the magnitude and the rate of change of any system schedule deviation.

As in the case of the galvanometer 46 and the motor 50 of Fig. 2, the galvanometer 92 controls the motor 78 through a suitable relay 96, which is connected between the galvanometer 92 and the motor 78 by suitable conductors 97. Thus, the motor 78 adjusts the phase shifter 80, and hence shifts the phase of the common reference signal, in one direction or the other, depending upon the direction of galvanometer pointer deflection, the polarity of the bridge unbalance signal, and the direction of the system schedule deviation. Also, the speed or rate at which the phase shifter 80 is adjusted by the motor 78, and hence the speed or rate at which the phase angle of the reference signal is advanced or retarded, is proportional to the extent and the rate of change of bridge unbalance, and to the magnitude and the rate of change of system schedule deviation. When there is no schedule deviation, and hence no bridge output, the motor 78 is not energized for rotation in either direction.

Summarizing the foregoing operation, the contact 74 is positioned in proportion to any deviation of system frequency and/or tie line loading from scheduled values.

The resulting bridge unbalance or output signal energizes the galvanometer 92, which controls the motor 78 to shift the phase angle of the reference signal at a rate proportional to the potential across the galvanometer, and hence at a rate proportional to both the magnitude and the rate of change of system schedule deviation.

Accordingly, there is provided at the dispatching office 1, and sent to all of the system plants, a common reference signal which is advanced in phase when the system frequency and/or the tie line loads deviate from schedule in the direction requiring an increase in the system generation, and which is retarded in phase when the schedule deviation is such as to require a decrease in system generation. In both cases, the rate of change of the reference signal phase angle is proportional to both the amount and the rate of change of the system schedule deviation.

It is noted that, if desired, the means for controlling the operation of the motor 78 and the adjustment of the phase shifter 80 in response to the output of the bridge 77 and the position of the deviation contact 74 may be of forms other than the proportional controlling galvanometer arrangement shown herein by way of example. Thus, this means could well be of the form of any of the well known so-called proportional plus reset controllers which are available on the market. The particular type of control equipment to be used for any specific situation depends on the factors and conditions particular to that situation.

THE ARRANGEMENTS OF FIGS. 4 AND 5

The apparatus of Fig. 2, operating in accordance with economic balance Equation 4, operates with a high degree of accuracy nothwithstanding the substantial differences between the values of the different K ratios which exist throughout the usual system. However, certain system patterns may justify special treatment if the systems contain a generating plant which is joined by a single transmission line to an intermediate point on the system other than the common reference point, and if there is a substantial difference between the value of K between the plant and the intermediate point, and the value of K between the intermediate point and the common reference point. In such cases, it may be desirable, in order to obtain the requisite operating accuracy, to perform the economic balance comparison for the plant in two successive steps, each step employing its own phase angle $\theta$ and ratio K. One of these steps covers the economic comparison between the plant and the intermediate point, and the other covers the economic comparison between the intermediate point and the reference point.

In order to carry out the foregoing operation, it is necessary to augment the Fig. 2 equipment at the plant, such as the arrangements 21 and 22, with additional apparatus for providing an effect at the plant of the equivalent generating cost at the intermediate point relative to the arbitrary reference generating cost at the reference point. Such apparatus, operating in conjunction with the Fig. 2 apparatus at the plant, provides the foregoing economic comparison between the intermediate and reference points, while the Fig. 2 apparatus effects the economic comparison between the plant and the intermediate point. Thus, all of this apparatus cooperates to control the plant output in the most economical manner by effecting the foregoing two economic comparisons.

There is illustrated in Fig. 4 a portion of the Fig. 2 apparatus for the Plant 1 which has been modified by the addition of apparatus for permitting the economic balance comparison for Plant 1 to be effected in two steps, as explained above. Thus it is assumed for explanatory purposes that Plant 1 in the Fig. 4 setting is a plan having the characteristics noted above which make it desirable to perform the economic comparison for the plant in two steps. Accordingly, with respect to Fig. 4, it is assumed that Plant 1 is connected by a single transmission path to an intermediate system point $x$, that the latter is connected to the reference point $o$, and that the value of the ratio $K_{x-1}$ is substantially different from the value of the ratio $K_{x-o}$.

A typical system configuration including a Plant 1, a point $x$, and a common reference point $o$, all related in the manner just described, is illustrated in Fig. 5. This figure shows the intermediate system point $x$ located between the Plant 1 and the common reference point $o$, and shows the single transmission path $X-1$ joining Plant 1 to point $x$. Thus, the system pattern shown in in Fig. 5 is typical of the type of pattern referred to above which may, and is assumed herein to, justify the special treatment afforded by augmented apparatus of the type shown in Fig. 4.

In addition to the former control section 22 and the phase angle determining portion 21 of Fig. 2, the Fig. 4 apparatus at Plant 1 includes a section 122 and a phase angle determining portion 121. The section 122 is substantially identical to the section 22, but effects the economic comparison between the intermediate point $x$ and the reference point $o$, using the values of the phase angle $\theta_{x-o}$ and the ratio $K_{x-o}$. As the result of this comparison, section 122 provides an output or a shaft position which is a function of the equivalent generating cost at point $x$ relative to the reference point $o$. The value of the phase angle $\theta_{x-o}$ is supplied to the section 122 by the phase angle determining portion 121, which is arranged and operative to provide this value in the same manner as that described above in connection with the portion 21 of Fig. 2. Therefore, that description need not be repeated at this point.

Because of the substantial identity between the portion 121 and its counterpart 21, and between the section 122 and its counterpart 22, the elements of the portion 121 and the section 122 bear the same reference characters as the corresponding elements in the portion 21 and the section 22 of Fig. 2, but in the one-hundreds series. Further, the portion 21 and section 22 of the Fig. 4 arrangement utilize the same reference characters as in Fig. 2.

In the Fig. 4 arrangement, the section 22 effects the economic balance comparison between the Plant 1 and the point $x$ in the same manner in which this section effects the comparison directly between Plant 1 and the reference point in Fig. 2. Also, section 22 in Fig. 4 controls the output of the Plant 1 generating units 19, etc. exactly as in the Fig. 2 arrangement. Since the section 22 of Fig. 4 is arranged to effect the economic balance comparison between Plant 1 and point $x$, instead of between Plant 1 and reference point $o$, the phase angle determining portion 21 of Fig. 4 supplies the section 22 with the value of the phase angle $\theta_{x-1}$.

Also, the arbitrary generating cost resistor 32 of section 22 is not set in accordance with the arbitrary reference generating cost at the reference point as it is in Fig. 2. Instead, the contact 39 of this resistor is positioned by the aforementioned shaft position provided by the section 122. Accordingly, the effective resistance of the resistor 32 is set in accordance with the value of the equivalent generating cost $F_x$ for point $x$ as determined by the section 122.

To this end, the output linkage or shaft 153 of the section 122 is connected to adjust the contact 39 in the section 22. A knob, pointer, and scale arrangement 93 is provided to permit the contact 39 to be adjusted relative to the position of the shaft 153, and hence independently of the generating cost value $F_x$, as necessary to compensate the section 22 for the various changes which affect the incremental generating cost value determined by the section 22, as described hereinbefore.

Since the construction and operation of the portion 21 and the section 22 in the Fig. 4 arrangement are the same as described hereinbefore in connection with the Fig. 2 arrangement, except for the differences just described, it is not deemed to be necessary to repeat the foregoing description at this point.

The section 122

To the end of positioning the shaft 153 and the cost resistor contact 39 in accordance with the value of the equivalent generating cost $F_x$, the section 122 is arranged as a self-balancing bridge circuit. Thus, the motor 150, controlled by the bridge output deviation, is arranged to position the contact 144 along the resistor 133, through the linkage or shaft 153, as necessary to maintain the bridge in balance. Accordingly, the position of the contact 144 along the resistor 133 represents the value of the cost $F_x$, and this position and value are imparted to the contact 39 in the section 22 by the shaft 153. A scale and pointer arrangement 99 is included to provide a desirable indication of the value of $F_x$.

OPERATION OF THE FIG. 4 APPARATUS

The phase angle determining portion 121 of the Fig. 4 apparatus receives the common reference signal from the dispatching office 1 by means of the channel 15, and also receives a signal, over a telemetering channel 115, which is representative of the phase of the voltage at point $x$. Instead of employing telemetering to supply the value of the point $x$ voltage phase to Plant 1, this value may be obtained from an impedance unit at Plant 1 which receives current from the transmission line connecting Plant 1 to point $x$. The portion 121 supplies to the section 122 the existing value of the phase angle $\theta_{x-o}$ between the voltage at the point $x$ and the reference signal.

The phase angle determining portion 21 receives the above signal having the phase of the voltage at point $x$, and also receives the signal from the plant bus having the phase of the plant bus voltage. The portion 21 supplies to the section 22 the existing value of the phase angle $\theta_{x-1}$ between the voltage at the point $x$ and the Plant 1 bus voltage.

The value of the constant ratio $K_{x-o}$ for points $x$ and $o$ is set into the section 122 by means of the knob 137, while the value of the constant ratio $K_{x-1}$ is set into the section 22 by means of the knob 37. Thus, the value of the incremental transmission loss ratio for points $x$ and $o$ is computed by the section 122, while this value for Plant 1 and point $x$ is computed by the section 22. The result of the combined operation of the sections 22 and 122 is that the effective incremental transmission loss ratio for Plant 1 relative to point $o$ is computed as the combination of the incremental transmission loss from Plant 1 to point $x$ and the incremental transmission loss from point $x$ to the reference point $o$. This operation is effected by the apparatus in two steps, each step employing its own value of phase angle $\theta$ and ratio K.

The foregoing settings of the knobs 37 and 137 to introduce into the apparatus the values of the two K ratios are desirably made in the same manner as that described above in connection with the setting of the knob 37 of the Fig. 2 apparatus. Similarly, the value of the arbitrary reference generating cost $F_0$ is set into the section 122 of Fig. 4 by the use of the knob 41 in the same manner as for the Fig. 2 arrangement.

By virtue of the foregoing, the motor 150, in positioning the resistor contact 144 as necessary to maintain the bridge circuit of section 122 balanced, positions this contact in accordance with the value of the equivalent generating cost $F_x$ at point $x$ corresponding to the arbitrary value of generating cost $F_0$ at the reference point $o$. Thus, the position of the contact 144 represents the value of $F_x$.

This computed value of $F_x$ is introduced into the section 22 by the shaft 153 and the resistor contact 39 adjusted thereby. Section 22 relates the value of the Plant 1 incremental generating cost, represented by the effective resistance of the resistor 33, to the value of the equivalent generating cost $F_x$, represented by the effective resistance of the resistor 32, and coordinates this relationship with the incremental transmission loss ratio for Plant 1 relative to point $x$. This results in the control and operation of Plant 1 as required to cause this plant to be in economic balance with the reference point $o$, and to be loaded in the most economical manner.

It is noted in connection with the foregoing that, even for a plant which has the characteristics and location of Plant 1 in Figs. 4 and 5, it is seldom worthwhile to take the special corrective steps provided by the Fig. 4 apparatus unless the system fuel relationships are such that the voltage phase angle at point $x$ is substantially less (or greater) than the bus voltage phase angle at Plant 1, or the reference phase angle for point $o$. That is, if the bus voltage at Plant 1 normally leads the voltage at point $x$, and the voltage at point $x$ normally leads the reference signal, the need for the corrective action provided by the Fig. 4 apparatus is minimized.

In connection with the foregoing, it is noted that apparatus of the type which constitutes the section 122 can desirably be utilized, for other than the correcting purposes for which it is utilized in the Fig. 4 arrangement, to provide its measure or indication of the value or cost of incremental energy or power at a desired, given point in the system. Thus, this apparatus of the type forming the section 122, plus the necessary phase angle determining portion, such as the portion 121, can be utilized at any convenient location for the purpose of providing at that location an indication of the incremental value or cost of energy at a given point in the economically balanced system. This point may or may not be at said location.

Such use of apparatus of this type is possible by virtue of the fact that, whenever Plants 1, 2, and 3 are in economic balance, the position of the contact 144 on the resistor 133, and the reading on the scale 99, provide a direct indication of the incremental value of energy at point $x$. That is, for system balance, the resistance from point 127 to contact 144 represents, in terms of the calibration of the $F_0$ resistor 132, the incremental cost of generation of a hypothetical plant at point $x$ which would be in economic balance with Plants 1, 2, and 3. Accordingly, such apparatus will function to determine, for an economically balanced system, the value or cost of energy at any given point in the system, such as an interconnection point with another system or area.

Such use of this apparatus requires, at the location where it is utilized, data as to the phase of the voltage of the common reference signal from the dispatcher, the phase of the voltage at the given point for which the apparatus is to determine the value of energy, the value of K for the transfer impedance between the system reference point and said given point, and the common arbitrary value of generating cost $F_0$ for the reference point. This data is the same as that shown applied to the section 122 in its use as a correcting arrangement in Fig. 4.

It is apparent that the apparatus of the portion 122, when used as an incremental energy value indicator for a given system point as just described, may be located at the given point, at the dispatching office 1, or at any other convenient location. When this given point is an interconnection point with another area or company, the incremental energy value indication provided by this apparatus will serve to provide optimum schedules of generation and interconnection flows.

CONCLUSION

By virtue of the use of the foregoing reference point comparison equation and method as the basis for the operation of the disclosed apparatus, the latter possesses many features of practical significance, as should be readily apparent in the light of the foregoing description. For example, such use permits the use of relatively simple apparatus at each plant for effecting the economic balance deviation detecting and deviation signal producing operations, as well as the economic assignment of the plant loads. Such use also permits the dispatching office equipment to be relatively simple. Moreover, the use of the phase angle method of incremental transmission loss computation makes the incremental transmission loss ratios computed by the apparatus independent of the relative or absolute magnitudes of the plant bus voltages, of the real power and reactive power ratios existing at the plants, of wide variations in load pattern, and of transmission line outages. Thus, the accuracy with which the incremental transmission losses are coordinated by the apparatus with the incremental generating costs in producing the deviation signals is substantially independent of:

(1) The magnitudes of the system loads;
(2) Extreme variations in system load pattern, due, for example, to strikes in industrial plants, etc.;
(3) Daily and seasonal variation in generated voltage levels and in the amount of normal voltage drop between plants and loads;
(4) Changes in phase angles in the system;
(5) The ratio of the real and reactive powers at various plants, and variations in these ratios; and
(6) The switching in and out of transmission lines.

It should be readily apparent from the foregoing that there has been provided novel apparatus operating in accordance with a novel method to assign the loads to the generating plants of a power system in accordance with their incremental costs of delivered energy. This apparatus operates according to my novel reference point comparison method and includes an arrangement located at each plant for computing the incremental generating cost and transmission loss ratios for the plant, and for controlling the plant output as necessary to maintain said ratios equal and the plant in economic balance with a common reference point. When all of the plants are so in balance with the reference point, they are in economic balance with each other. Such balance is made possible by the use of a common reference phase signal which is sent to all of the plants and which provides not only the basis for the incremental transmission loss computations and the economic balance comparisons, but also provides the means by which the plant outputs are controlled so as to satisfy the system requirements in the most economical manner.

What is claimed is:

1. Apparatus for assigning the loads to the interconnected generating plants of a power system in accordance with the incremental costs of delivered energy for the plants, comprising a separate computing means located at each of selected ones of said plants and arranged to produce at the corresponding plant an effect which is representative of the incremental cost of delivered energy for the corresponding plant with respect to a predetermined reference point in said system which is common to all of said selected plants, and an additional means at each of said selected plants which is responsive to said effect at that plant and which is arranged to determine at that plant the load to be assigned thereto in order to establish equality between the incremental costs of delivered energy for all of said selected plants.

2. Apparatus for assigning the loads to the interconnected generating plants of a power system in accordance with the incremental costs of delivered energy for the plants, comprising a separate computing means located at each of selected ones of said plants and arranged to produce at the corresponding plant an effect which is representative of the incremental cost of delivered energy for the corresponding plant with respect to a prededetermined reference point in said system which is common to all of said selected plants, and an additional means at each of said selected plants which is responsive to said effect at that plant and which is arranged to control the output of that plant to the value at which the incremental cost of delivered energy for that plant is equal to that for all of the others of said selected plants.

3. Apparatus for assigning the loads to the interconnected generating plants of a power system in accordance with the incremental costs of delivered energy for the plants, comprising a separate computing means located at each of selected ones of said plants and responsive to the phase of a common reference signal which is supplied to each of said selected plants and which has the same phase at all of said selected plants, each of said computing means being arranged to produce at the corresponding plant and under the control of said signal an effect which is representative of the incremental cost of delivered energy for the corersponding plant with respect to a predetermined reference point in said system which is common to all of said selected plants, and an additional means at each of said selected plants which is responsive to said effect at that plant and which is arranged to determine at that plant the load to be assigned thereto in order to establish equality between the incremental costs of delivered energy for all of said selected plants.

4. Apparatus for assigning the loads to the interconnected generating plants of a power system in accordance with the incremental costs of delivered energy for the plants, comprising a separate computing means located at each of selected ones of said plants and arranged to produce at the corresponding plant an effect which is representative of any departure of the incremental cost of delivered energy for the corresponding plant, with respect to a predetermined reference point in the system which is common to all of said selected plants, from equality with a common value of incremental delivered energy cost for all of said selected plants which represents a minimum total delivered energy cost in the system, and an additional means at each of said selected plants which is responsive to said effect at that plant and which is arranged to determine at that plant the load to be assigned thereto in order to eliminate said departure and to establish equality between the incremental costs of delivered energy for all of said selected plants.

5. Apparatus for assigning the loads to the interconnected generating plants of a power system in accordance with the incremental costs of delivered energy for the plants, comprising a separate computing means located at each of selected ones of said plants and responsive to the phase of a common reference signal which is supplied to each of said selected plants and which has the same phase at all of said selected plants, each of said computing means being arranged to produce at the corresponding plant an effect which is representative of any departure of the incremental cost of delivered energy for the corresponding plant, with respect to a predetermined reference point in the system which is common to all of said selected plants, from equality with a common value of incremental delivered energy cost for all of said selected plants which represents a minimum total delivered energy cost in the system, an additional means at each of said selected plants which is responsive to said effect at that plant and which is arranged to control the output of that plant to the value which eliminates said departure and establishes equality between the incremental costs of delivered energy for all of said selected plants, and adjustable means separate from said selected plants and arranged to vary said phase of said reference signal and hence to vary the outputs of said selected plants as a whole through said computing portions and in accordance with the adjustment of said adjustable means.

6. Apparatus for assigning the loads to the inter-connected generating plants of a power system in accordance with the incremental costs of delivered energy for the plants, comprising a separate computing portion located at each of selected ones of said plants, each of said portions including means arranged to compute at the corresponding plant the economic balance value of output for that plant corresponding to economic balance between the incremental transmission losses and the incremental generating costs for that plant with respect to a common reference point in said system, each of said means including other means arranged to compute at the corresponding plant an effect which is representative of the incremental transmission loss for that plant with respect to said point, and which is a function of the phase angle between the bus voltage of the corresponding plant and a reference voltage having the same phase at each of said selected plants, said economic balance output values being the plant loads which cause the latter to operate with equal incremental costs of delivered energy at any given time.

7. Apparatus for assigning the loads to the interconnected generating plants of a power system in accordance with the incremental costs of delivered energy for the plants, comprising a separate computing portion located at each of said plants and arranged to compute the economic balance value of output for the associated plant corresponding to economic balance between said associated plant and a common reference point in said system, each of said portions including means arranged to produce an effect which is a function of the phase angle between the bus voltage of said associated plant and a reference voltage having the same phase at each of said plants, said effect being representative of the incremental transmission loss between said associated plant and said point, said means being arranged also to determine the economic balance value of output for said associated plant at which an effect which is representative of the incremental generating cost for said associated plant relative to said point balances said incremental transmission loss effect therefor, said economic balance output values being the plant loads for the corresponding plants which cause the latter to operate with equal incremental costs of delivered energy for the existing system conditions.

8. Apparatus for assigning the loads to the inter-connected generating plants of a power system in accordance with the incremental costs of delivered energy for the plants, comprising a computing portion individual to and located at each of said system plants and arranged to adjust the output thereof to the economic balance value therefor at which the incremental generating cost for the corresponding plant with respect to a common reference point in said system balances the incremental transmission loss for that plant with respect to said point, each of said portions including means arranged to provide a measure of the incremental transmission loss for the corresponding plant which is a function of the phase angle between the bus voltage of that plant and a reference voltage having the same phase at each of said plants, said economic balance values being the plant loads for the corresponding plants at which the latter will operate with equal incremental costs of delivered energy for the existing system conditions.

9. Apparatus for assigning to a generating plant in a power system the load required to balance the incremental transmission losses and generating costs for the plant with respect to a reference point in the system, comprising means to adjust the output of said plant to the balance value at which the phase angle between the bus voltage of said plant and a reference voltage has a value which satisfies the equation $$\frac{dF/dP - F}{dF/dP + F} = -\frac{0.0184K}{K^2 + 0.17}\theta$$

wherein $dF/dP$ is the incremental generating cost for said plant for the value of output represented by said balance value, F is an arbitrary reference generating cost for said system reference point, $\theta$ is the value of said phase angle in electrical degrees, and K is the constant ratio of the reactance to the resistance of the transfer impedance between said plant and said system reference point, said balance value for the output of said plant being said required load for said plant.

10. Apparatus for determining the incremental value of energy at a given point in a power system, comprising means arranged to produce a first effect which is a function of the phase angle between the voltage at said given point and a reference voltage, and which is representative of the incremental transmission loss between said given point and a reference point in said system, means arranged to produce a second effect which is representative of an arbitrary value of energy at said reference point, and means arranged to compare said first and second effects and to produce a third effect which together with said second effect balances said first effect, the balance value of said third effect being representative of the value of energy at said given point when said system is substantially in economic balance.

11. Apparatus for determining the incremental value of energy at a given point in a power system, comprising means arranged to produce an effect having a value which is a function of the phase angle between the voltage at said given point and a reference voltage, a bridge circuit adapted to be energized and having impedance means located in two adjacent bridge arms, a contact forming a first output terminal of said bridge and arranged to be adjusted along said impedance means in accordance with the value of said effect, means arranged to adjust the effective value of said impedance means in said adjacent bridge arms in accordance with the value of the ratio of the reactance to the resistance of the transfer impedance between said given point and a reference point in said system, the potential at said contact being representative of the value of the incremental transmission loss between said given point and said reference point, a first adjustable impedance device located in a third arm of said bridge and arranged to be adjusted in accordance with an arbitrary value of energy at said reference point, a second adjustable impedance device located in the fourth arm of said bridge, the junction between said first and second impedance devices forming a second output terminal of said bridge, and means responsive to the bridge unbalance potential between said bridge output terminals and arranged to adjust said second impedance device as required to rebalance said bridge, the bridge balance value of said second impedance device being representative of the value of energy at said given point when said system is substantially in economic balance.

12. Apparatus for determining the output to be assigned to a generating plant in a power system to cause the plant to be in economic balance with respect to a system reference point, comprising means arranged to produce an effect having a value which is a function of the phase angle between the bus voltage of said plant and a reference voltage, a bridge circuit adapted to be energized and having impedance means located in two adjacent bridge arms, a contact forming a first output terminal of said bridge and arranged to be adjusted along said impedance means in accordance with the value of said effect, means arranged to adjust the effective value of said impedance means in said adjacent bridge arms in accordance with the value of the ratio of the reactance to the resistance of the transfer impedance between said plant and said reference point, the potential of said contact being representative of the value of the incremental transmission loss between said plant and said reference point, a first adjustable impedance device located in a third arm of said bridge and arranged to be adjusted in accordance with an arbitrary reference generating cost for said reference point, a second adjustable impedance device located in the fourth arm of said bridge, the junction between said first and second impedance devices forming a second output terminal of said bridge, and means responsive to the bridge unbalance potential between said bridge output terminals and arranged to adjust the output of said plant and to adjust said second impedance device as required to rebalance said bridge and to cause the potential of said junction to be representative of the value of the incremental generating cost for said plant relative to said reference point, whereby said plant will operate in economic balance with respect to said reference point.

13. Apparatus for assigning the loads to the interconnected generating plants of a power system in accordance with the incremental costs of delivered energy for the plants, comprising a computing portion individual to and located at each of said system plants, each of said portions including first means arranged to derive a first effect which is representative of the value of the phase angle between the bus voltage of the corresponding plant and a reference voltage having the same phase at each of said plants, second means arranged to compute from said first effect a second effect which is a function of said phase angle and which is representative of the incremental transmission loss for said corresponding plant with respect to a common reference point in said system, third means arranged to compute a third effect which is a function of the output of said corresponding plant and which is representative of the incremental generating cost for said corresponding plant with respect to said reference point, and fourth means arranged to adjust the output of said corresponding plant to the economic balance value required to establish equality between said second and third effects, said economic balance values of the outputs of said plants representing the economic combination of loadings for said plants at which the latter will operate with equal incremental costs of delivered energy.

14. Apparatus as specified in claim 13 wherein said second and third means in each of said portions are included in a bridge circuit which is balanced when the corresponding second and third effects are equal, and wherein said fourth means in each of said portions includes motor means responsive to unbalance of said bridge circuit and arranged to adjust the output of the corresponding plant as required to balance said bridge circuit.

15. Apparatus as specified in claim 13, wherein the phase of said reference voltage is adjusted externally of said plants by adjustable means responsive to a need for changes in the outputs of said plants, and wherein the adjustment of said adjustable means varies the outputs of said plants as a whole through the medium of the phase of said reference voltage and said computing portions.

16. Apparatus for assigning the loads to the interconnected generating plants of a power system in accordance with the incremental costs of delivered energy for the plants, comprisnig a separate computing portion individual to each of said system plants and arranged to compute the economic balance value of output for the associated plant corresponding to economic balance between said associated plant and a common reference point in said system, each of said portions including means arranged to produce a first effect which is a function of the phase angle between the bus voltage of the corresponding plant and a reference voltage, and which is representative of the incremental transmission loss for said corresponding plant with respect to said reference point in said system, means arranged to produce a second effect which is representative of an arbitrary value of energy at said reference point, and means arranged to compare said first and second effects and to produce a third effect which together with said second effect balances said first effect, the balance value of said third effect being representative of the incremental generating cost or value of energy at said corresponding plant when said system is substantially in economic balance, and being representative of said economic balance value of output for said corresponding plant, said economic balance output values being the plant loads for the corresponding plants which cause the latter to operate with equal incremental costs of delivered energy for the existing system conditions.

17. Apparatus for assigning the loads to the interconnected generating plants of a power system in accordance with the incremental costs of delivered energy for the plants, comprising a computing portion individual to each of said system plants and arranged to adjust the output thereof to the economic balance value therefor at which the incremental generating cost for the corresponding plant with respect to a common reference point in said system together with an arbitrary reference generating cost for said point balances the incremental transmission loss for that plant with respect to said point, each of said portions including means arranged to produce a first effect which is a function of the phase angle between the bus voltage of the corresponding plant and a reference voltage, and which is representative of the incremental transmission loss for said corresponding plant with respect to said reference point in said system, means arranged to produce a second effect which is representative of an arbitrary value of energy or reference generating cost at said reference point, and means arranged to compare said first and second effects and to produce a third effect which together with said second effect balances said first effect, the last mentioned means including means for effecting said adjustment of the output of said corresponding plant to the economic balance value therefor which corresponds to the balance value of said third effect, the latter being representative of the incremental generating cost or value of energy at said corresponding plant when said system is substantially in economic balance, and said economic balance values being the plant loads for the corresponding plants at which the latter will operate with equal incremental costs of delivered energy for the existing system conditions.

No references cited.